(12) United States Patent
Grammel

(10) Patent No.: US 9,699,035 B1
(45) Date of Patent: *Jul. 4, 2017

(54) TOPOLOGY DETERMINATION FOR AN OPTICAL NETWORK

(71) Applicant: Juniper Networks, Inc., Sunnyvale, CA (US)

(72) Inventor: Gert Grammel, Ditzingen (DE)

(73) Assignee: Juniper Networks, Inc., Sunnyvale, CA (US)

( * ) Notice: Subject to any disclaimer, the term of this patent is extended or adjusted under 35 U.S.C. 154(b) by 212 days.

This patent is subject to a terminal disclaimer.

(21) Appl. No.: 14/612,107

(22) Filed: Feb. 2, 2015

Related U.S. Application Data

(63) Continuation of application No. 13/288,856, filed on Nov. 3, 2011, now Pat. No. 8,948,005.

(51) Int. Cl.
| | | |
|---|---|---|
| *H04L 12/28* | (2006.01) | |
| *G06F 15/177* | (2006.01) | |
| *H04L 12/24* | (2006.01) | |
| *H04B 10/27* | (2013.01) | |
| *H04B 10/07* | (2013.01) | |

(52) U.S. Cl.
CPC ............. *H04L 41/12* (2013.01); *H04B 10/07* (2013.01); *H04B 10/27* (2013.01)

(58) Field of Classification Search
CPC ....... H04L 1/24; H04L 1/243; H04L 12/2602; H04L 12/2697; H04L 41/0866; H04L 41/12; H04L 41/16; H04L 43/00; H04L 43/06; H04L 43/50; H04L 45/02; H04L 2012/5628; H04L 2012/5636; H04L 12/28; H04B 3/46; H04B 10/07; H04B 10/0775; H04B 10/27; H04B 17/00; H04W 76/00; H04W 76/02; H04W 76/045; H04Q 3/0062; H04Q 9/00; H04Q 11/0005; H04Q 2011/0083; G01S 19/20; G01R 31/31903; G06Q 20/203; G06F 11/3065; G06F 11/00; G06F 15/177; A61B 6/586
See application file for complete search history.

(56) References Cited

U.S. PATENT DOCUMENTS

| | | |
|---|---|---|
| 6,005,695 A | 12/1999 | Roberts |
| 6,363,078 B1 | 3/2002 | Garcia et al. |
| 6,381,269 B1 | 4/2002 | Gradl et al. |

(Continued)

OTHER PUBLICATIONS

Fredette, "Link Management Protocol (LMP) for Dense Wavelength Division Multiplexing (DWDM) Optical Line Systems," found at http://tools.ietf.org/id/draft-ietf-ccamp-lmp-wdm-03.txt., Dec. 2003, 16 pp.

(Continued)

*Primary Examiner* — Tri H Phan
(74) *Attorney, Agent, or Firm* — Shumaker & Sieffert, P.A.

(57) ABSTRACT

Techniques are described for determining the topology of an optical network. A computing device receives a message on a data communication network after a first device in an optical network receives an optical pulse pattern on an optical fiber in the optical network. The computing device generates topology data using the message. The topology data indicates that a second device is physically connected in the optical network to the first device when the received optical pulse pattern matches an optical pulse pattern sent by the second device.

12 Claims, 15 Drawing Sheets

(56) References Cited

U.S. PATENT DOCUMENTS

| | | | |
|---|---|---|---|
| 6,496,022 B1 * | 12/2002 | Kash | G01R 31/311 324/754.23 |
| 6,684,351 B1 | 1/2004 | Bendak et al. | |
| 6,798,752 B1 * | 9/2004 | Pope | H04L 41/12 370/254 |
| 8,406,633 B1 * | 3/2013 | Johnston | H04J 3/0608 398/154 |
| 8,417,114 B1 | 4/2013 | Storey et al. | |
| 8,434,039 B2 * | 4/2013 | Watt | G06F 17/5036 716/108 |
| 8,948,005 B1 | 2/2015 | Gert | |
| 2002/0163687 A1 * | 11/2002 | Boden | H04J 14/0227 385/24 |
| 2005/0078606 A1 * | 4/2005 | Bernstein | H04L 69/329 370/241 |
| 2005/0086336 A1 | 4/2005 | Haber | |
| 2007/0025738 A1 * | 2/2007 | Moore | H04B 10/1149 398/189 |
| 2007/0025739 A1 * | 2/2007 | Moore | H04B 10/66 398/202 |
| 2008/0165348 A1 | 7/2008 | Kim et al. | |
| 2009/0010643 A1 | 1/2009 | DeLew et al. | |

OTHER PUBLICATIONS

Notice of Allowance from U.S. Appl. No. 13/288,856, dated Nov. 25, 2014, 11 pp.

* cited by examiner

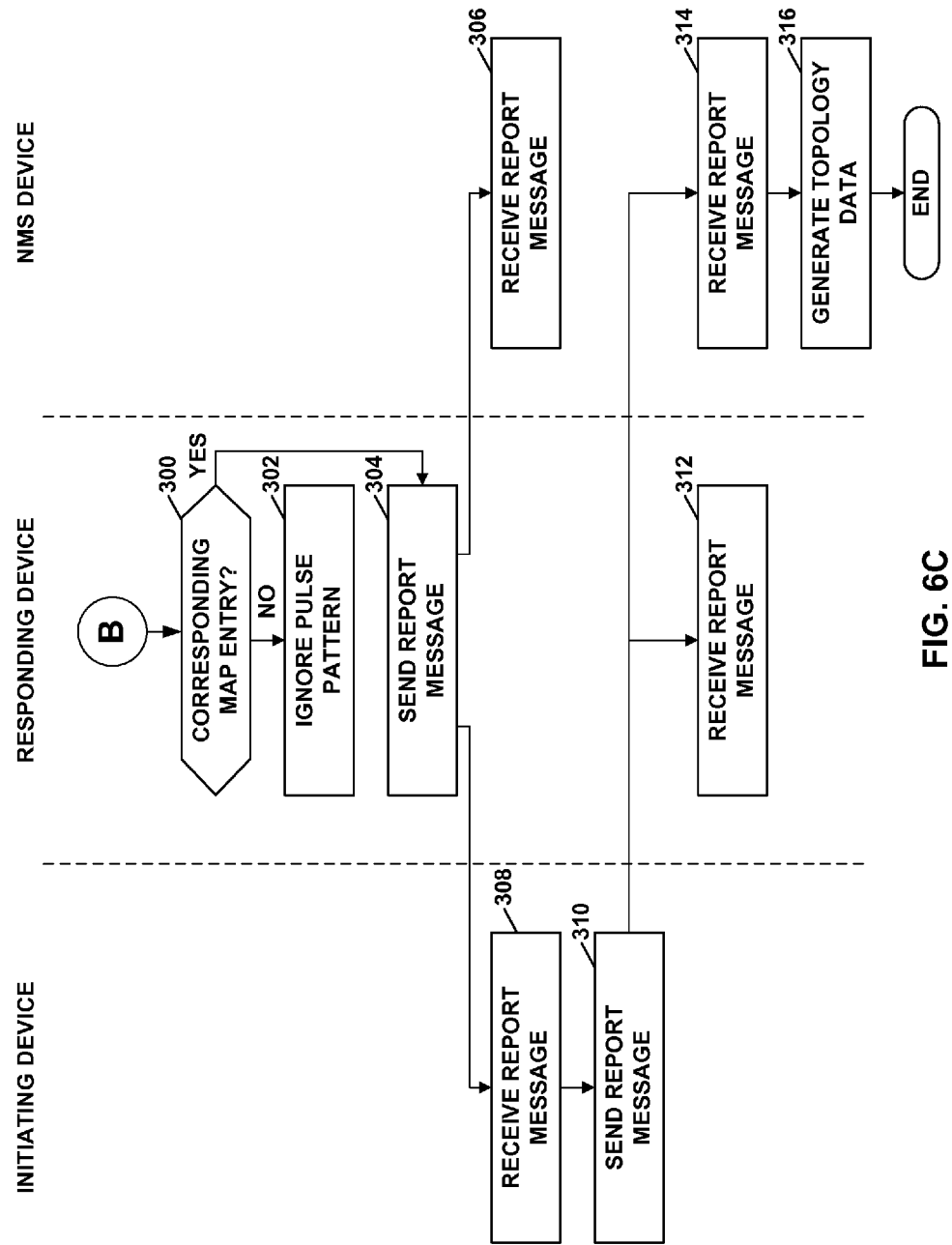

TOPOLOGY DETERMINATION FOR AN OPTICAL NETWORK

This application is a continuation of U.S. patent application Ser. No. 13/288,856, filed Nov. 3, 2011, the entire content of which is incorporated herein by reference.

TECHNICAL FIELD

This disclosure relates to optical networks.

BACKGROUND

In some instances, it may be important for a network administrator to determine the topology an optical network. For example, it may be helpful for the network administrator to determine that an optical fiber connects a given port of one device in the optical network to a given port of another device in the optical network. Knowledge of the topology of the optical network may be helpful when establishing routes through the optical network, diagnosing and remedying problems in the optical network, and for performing other manual or automated network management tasks.

Several approaches have been suggested as ways of determining the topologies of optical networks. Some of these approaches rely on a device sending wavelength-modulated optical signals on various ports of the device. The wavelength-modulated optical signal sent on a given port of the sending device encodes information that identifies the sending device and the given port. If a device receives the modulated optical signal on a given port, the receiving device demodulates the optical signal and outputs a report message to a network management system (NMS). The report message indicates that an optical fiber connects the given port of the receiving device to the given port of the sending device. The NMS may use such messages to generate topology data for the optical network. While effective, this approach requires the receiving device to include hardware to demodulate the optical signal. Such hardware may be complex and expensive, and only available in systems where a sending device is able to encode information in a wavelength modulated signal.

SUMMARY

In general, this disclosure describes techniques for determining the topology of an optical network. A computing device receives a message on a data communication network after a first device in an optical network receives an optical pulse pattern on an optical fiber in the optical network. The computing device generates topology data using the message. The topology data indicates that a second device is physically connected in the optical network to the first device when the received optical pulse pattern matches an optical pulse pattern sent by the second device.

In one aspect, this disclosure describes a method of determining a topology of an optical network. The method comprises receiving, at a computing device, a message on a data communication network separate from the optical network. The message includes data that identifies a first device in the optical network and indicates that the first device previously received an optical pulse pattern from an optical fiber in the optical network. The method also comprises generating, by the computing device, topology data using the message. The topology data indicate that a second device is connected in the optical network to the first device when the received optical pulse pattern matches an optical pulse pattern originated by the second device.

In another aspect, this disclosure describes a method comprising receiving, at a first device in an optical network, an optical pulse pattern from a first optical fiber in the optical network. The method also comprises determining, by the first device, that the optical pulse pattern is mapped to a second device in the optical network. In addition, the method comprises sending, by the first device, a report message on a data communication network after determining that the optical pulse pattern is mapped to the second device. The report message indicates that the first device is physically connected in the optical network to the second device. The data communication network is separate from the optical network.

In another aspect, this disclosure describes a device in an optical network. The device comprises a reporting system that determines, after the device receives an optical pulse pattern on a first optical fiber in the optical network, that the optical pulse pattern is mapped to a second device in the optical network. In addition, the device comprises a data communication network interface that sends a report message on a data communication network after the reporting system determines that the optical pulse pattern is mapped to the second device. The report message indicates that the device is physically connected to the second device. The data communication network is separate from the optical network.

In another aspect, this disclosure describes a computer-readable storage medium that stores instructions that, when executed by a processor of a first device in an optical network, cause the processor to determine, after the first device receives an optical pulse pattern on an optical fiber in the optical network, that the optical pulse pattern is mapped to a second device in the optical network. The instructions also cause the processor to cause a network interface of the first device to send a report message on a data communication network after determining that the optical pulse pattern is mapped to the second device. The report message indicates that the first device is physically connected in the optical network to the second device. The data communication network is separate from the optical network.

In another aspect, this disclosure describes a method comprising sending, by a first device in an optical network, a first optical pulse pattern on a first optical fiber in the optical network. The method also comprises receiving, by the first device, a pulse response message on a data communication network. The pulse response message indicates an optical pulse pattern received by a second device in the optical network. The data communication network is separate from the optical network. The method also comprises determining, by the first device, whether the optical pulse pattern received by the second device matches the first optical pulse pattern. In addition, the method comprises sending a report message on the data communication network when the optical pulse pattern received by the second device matches the first optical pulse pattern. The report message indicates that the second device is physically connected in the optical network to the first device.

In another aspect, this disclosure describes a device in an optical network. The device comprises a first port connected to a first optical fiber in the optical network. The first port is configured to send a first optical pulse pattern on the first optical fiber. The device also comprises a network interface configured to receive a pulse response message on a data communication network. The pulse response message indicates an optical pulse pattern received by a second device in the optical network. The data communication network is separate from the optical network. The device also comprises a reporting system configured to determine whether the optical pulse pattern received by the second device matches the first optical pulse pattern. The network interface sends a report message on the data communication network when the optical pulse pattern received by the second device matches the optical pulse pattern sent on the first port, the report message indicating that the second device is physically connected in the optical network to the device.

In another aspect, this disclosure describes a computer-readable storage medium that stores instructions that, when executed by a processing unit of a first device in an optical network, cause the first device to send an optical pulse pattern on an optical fiber in the optical network. The instructions also cause the first device to determine, in response to receiving a pulse response message on a data communication network, whether an optical pulse pattern received by a second device in the optical network matches the optical pulse pattern sent by the first device. The pulse response message indicates the optical pulse pattern received by the second device, the data communication network being separate from the optical network. Execution of the instructions also causes the first device to send a report message on the data communication network, the report message indicating that the second device is physically connected in the optical network to the first device.

In another aspect, this disclosure describes a system comprising a data communication network (DCN). The system also comprises an optical network comprising an optical fiber and a first device. The first device comprises a first port. The first port is connected to the optical fiber. The first port is configured to send an optical pulse pattern on the optical fiber. The optical network also comprises a second device. The second device comprises a second port. The second port is connected to the optical fiber. The second port receives the optical pulse pattern. The second device also comprises a reporting system that determines that the optical pulse pattern is mapped to the first device. In addition, the second device comprises a second network interface. The second network interface is connected to the DCN. The second network interface sends a report message on the DCN after the reporting system determines that the optical pulse pattern is mapped to the first device. The report message indicates that the second device is physically connected in the optical network to the first device. The system also comprises a network management system (NMS) device connected to the DCN. The NMS device receives the report message and uses the report message to generate topology data.

The details of one or more examples are set forth in the accompanying drawings and the description below. Other features, objects, and advantages will be apparent from the description and drawings, and from the claims.

BRIEF DESCRIPTION OF DRAWINGS

FIG. 6C is a flowchart that illustrates a third part of the exemplary set of operations of FIGS. 6A and 6B.

DETAILED DESCRIPTION

The attached drawings illustrate examples. Elements indicated by reference numbers in the attached drawings correspond to elements indicated by like reference numbers in the following description. In the attached drawings, ellipses indicate the presence of one or more elements similar to those separated by the ellipses. Furthermore, stacked elements in the attached drawings indicate the presence of one or more similar elements. Alphabetical suffixes on reference numbers for similar elements are not intended to indicate the presence of particular numbers of the elements. In this disclosure, elements having names that start with ordinal words (e.g., "first," "second," "third," and so on) do not necessarily imply that the elements have a particular order. Rather, such ordinal words are merely used to refer to different elements of a same or similar type. In this disclosure, the term "exemplary" refers to "something serving as an example, instance, or illustration," and should not necessarily be construed as preferred or advantageous over other configurations or designs.

Figure 1:
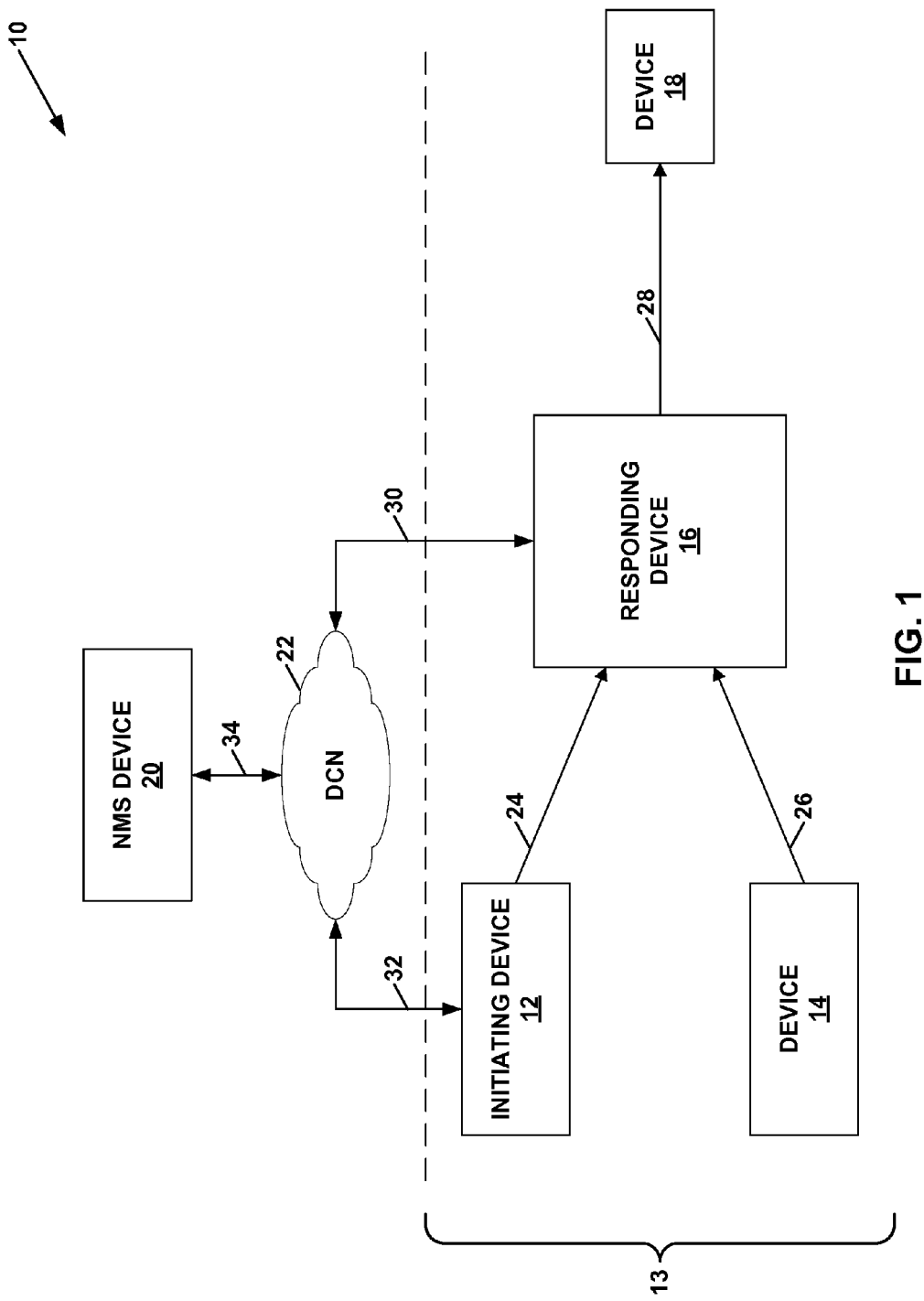
FIG. 1 is a conceptual block diagram that illustrates an example network system.

FIG. 1 is a block diagram illustrating an example network system 10. Network system 10 includes an optical network 13 having initiating device 12, device 14, responding device 16, and device 18. In addition, network system 10 includes Network Management System (NMS) device 20 that is coupled to initiating device 12 and responding device 14 via data communication network (DCN) 22. Optical network 13 also includes optical fibers 24, 26, and 28. Optical fiber 24 connects initiating device 12 to responding device 16. Optical fiber 26 connects device 14 to responding device 16. Optical fiber 28 connects responding device 16 to device 18. A link 30 connects responding device 16 to DCN 22. A link 32 connects initiating device 12 to DCN 22. A link 34 connects NMS device 20 to DCN 22. Network system 10 may include additional components, optical fibers, and communication links.

Each of devices 12, 14, 16, 18 may represent devices, such as routers, switches, repeaters, optical cross-connects (OXCs), or other types of devices, within optical network 13 that forward optical data. For example, devices 12, 18 may be layer three (L3) routers optically connected by an intermediate OXC, i.e., responding device 16 in the example of FIG. 1. The remainder of this description assumes that responding device 16 is a multiplexing device. However, responding device 16 may be another type of network device. For instance, responding device 16 may be another router.

NMS device 20 is typically a computing device that provides a platform for network management software for managing the devices within optical network 13. For example, NMS device 20 may comprise a server, a workstation, a personal computer, a laptop computer, a tablet computer, a smartphone, or another type of computing device.

DCN 22 is a packet-based network (e.g., a wired Ethernet network) that facilitates communication between NMS device 20 and the various network devices that form optical network 13. In various examples, DCN 22 may include wired and/or wireless communication links. Typically, DCN 22 is a backend network within a service provider that is separate from optical network 13, and does not include, optical fibers 24, 26, and 28, that form a transport optical network 13 within the service provider for routing and forwarding data traffic.

Typically, each of devices 12, 14, and 18 may comprise multiple line cards, also referred to as interface cards. The term "line card" may refer to a modular electronic circuit board that provides one or more physical interfaces between a network device and a communications link, such as an optical fiber. Each line card of devices 12, 14, and 18 is associated with one or more ports. Each of the ports provides a physical connection between a device and an optical fiber. Responding device 16 may also include multiple line cards. Each line card of responding device 16 may be associated with one or more ports.

In the simplified example of FIG. 1, optical fiber 24 connects one of the ports of one of the line cards of initiating device 12 to one of the ports of one of the line cards of responding device 16. Optical fiber 26 connects one of the ports of one of the line cards of device 14 to one of the ports of one of the line cards of responding device 16. Optical fiber 28 connects one of the ports of one of the line cards of responding device 16 to one of the ports of one of the line cards of device 18. Thus, initiating device 12, device 14, responding device 16, device 18, optical fibers 24, 26, and 28 form at least part of optical network 13.

Initiating device 12 and device 14 are configured to output optical signals onto optical fibers 24 and 26. In some examples, the optical signals output by devices 12 and 14 have different carrier wavelengths. Devices 12 and 14 may modulate the carrier wavelengths of the optical signals in order to convey data. In some examples, the optical signals may conform to a Synchronous Optical Networking (SONET) protocol or a Synchronous Digital Hierarchy (SDH) protocol.

When devices 12 and 14 output wavelength-modulated optical signals on optical fibers 24 and 26, responding device 16 receives the optical signals. In typical operation, responding device 16 provides a cross-connect that multiplexes optical signals received on optical fibers 24 and 26 into a single multiplexed optical signal that responding device 16 outputs on optical fiber 28. The multiplexed optical signal may include optical signals having different carrier wavelengths. In some examples, responding device 16 receives an optical signal from device 18 on optical fiber 28, demultiplexes the optical signal, and outputs separate optical signals on optical fibers 24 and 26.

To perform some network management tasks via NMS device 20, it may be valuable for an administrator to have data indicating an accurate topology of optical network 13, including the particular ports that are used to interconnect the infrastructure devices within optical network 13. For example, the data indicating the topology of optical network 13 may include data that indicate that initiating device 12 is physically connected in optical network 13 to responding device 16. In another example, the data indicating the topology of optical network 13 may include data that indicate that optical fiber 24 connects a given line card and port of initiating device 12 to a given line card and port of responding device 16. A network administrator may want to know such data in order to determine whether optical fiber 24 is connected to the correct line cards and ports. The techniques described in this disclosure may help NMS device 20 accurately generate data indicating the topology of optical network 13.

Initiating device 12 may send an optical pulse pattern on optical fiber 24. To send the optical pulse pattern, initiating device 12 may turn a light source on and off according to a temporal pattern. In some examples, initiating device 12 does not modulate data onto the optical pulse pattern. In other words, a wavelength of light in the optical pulse pattern may be not modulated to convey data. Subsequently, a given port of responding device 16 may receive the optical pulse pattern from optical fiber 24.

In accordance with the techniques of this disclosure, NMS device 20 may receive a message on DCN 22 after responding device 16 receives an optical pulse pattern from optical fiber 24. The message may include data that identify responding device 16 and indicate that responding device 16 received the optical pulse pattern. NMS device 20 may generate topology data using the message. The topology data may indicate that initiating device 12 is physically connected in optical network 13 to responding device 16 when the optical pulse pattern received by responding device 16 matches an optical pulse pattern sent by initiating device 12. In some examples, initiating device 12 sends the message to NMS device 20. In other examples, responding device 16 sends the message to NMS device 20.

In various examples, the message includes various data. For instance, in some examples where initiating device 12 sends the message to NMS device 20, the message may indicate that initiating device 12 is physically connected in optical network 13 to responding device 16. In some such examples, initiating device 12 may send an optical pulse pattern on optical fiber 24. Subsequently, initiating device 12 may receive a first report message on DCN 22. The first report message may indicate an optical pulse pattern received by responding device 16. Initiating device 12 may then determine whether the optical pulse pattern received by responding device 16 matches the optical pulse pattern sent by initiating device 12. If so, initiating device 12 sends the message indicating that initiating device 12 is physically connected in optical network 13 to responding device 16. In such examples, the message may indicate that that responding device 16 received the optical pulse pattern by including the data identifying responding device 16 in the message.

In examples where responding device 16 sends the message to NMS device 20, the message may indicate that initiating device 12 is physically connected in optical network 13 to responding device 16. In some such examples, responding device 16 may determine, in response to receiving the optical pulse pattern, whether the optical pulse pattern is mapped to another device in optical network 13. For example, responding device 16 may determine whether the optical pulse pattern is mapped to initiating device 12. If the optical pulse pattern is mapped to another device in optical network 13, the message may indicate that responding device 16 is physically connected to the other device. In such examples, the message may indicate that responding device 16 received the optical pulse pattern by including the data identifying responding device 16.

In other examples where responding device 16 sends the message to NMS device 20, the message may include a pulse pattern descriptor that describes an optical pulse pattern received by responding device 16. In such examples, the message may indicate that responding device 16 received the optical pulse pattern by including the data identifying responding device 16. Furthermore, in such examples, NMS device 20 may also receive a notification message from initiating device 12. The notification message may include a pulse pattern descriptor that describes an optical pulse pattern sent by initiating device 12. In such examples, NMS device 20 may determine whether the optical pulse pattern received by responding device 16 matches the optical pulse pattern sent by initiating device 12. If so, NMS device 20 may generate topology data indicating that initiating device 12 is physically connected in optical network 13 to responding device 16.

The techniques of this disclosure may provide one or more advantages. For example, the techniques may allow for accurate topology information to be generated for optical networks that include devices that are unable to decode information from wavelength modulated signals. In systems employing the techniques of this disclosure, it may be unnecessary for responding device 16 to include circuitry to demodulate optical signals from a device, such as initiating device 12, in order to generate topology data that indicate that responding device 16 is physically connected to the device. Leaving such circuitry out of responding device 16 may reduce the complexity and cost of responding device 16. Furthermore, the messages generated by responding device 16 and initiating device 12 may conform to an existing format or standard. Thus, it may be unnecessary to reconfigure NMS device 22 to understand new types of messages.

Figure 2:
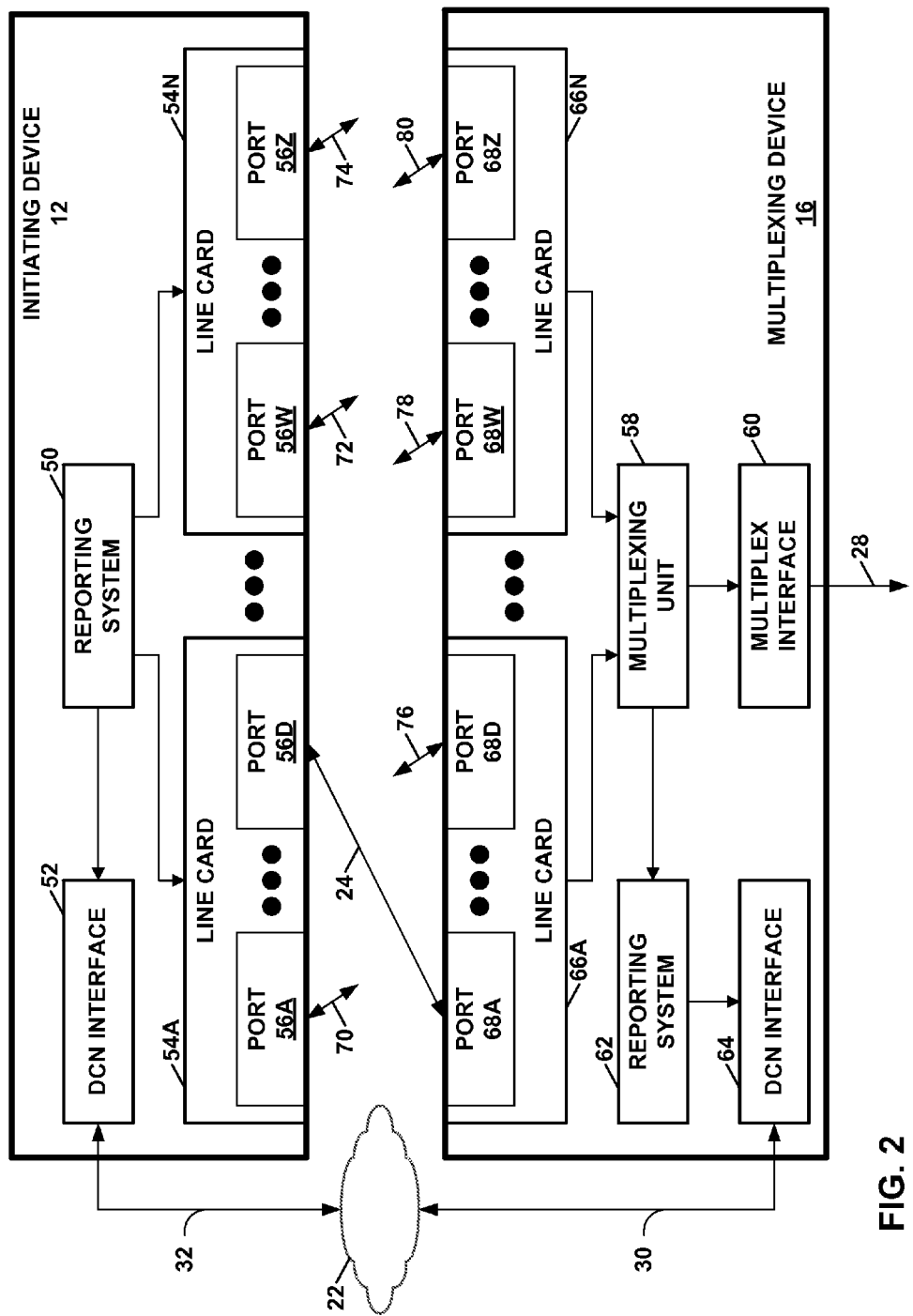
FIG. 2 is a conceptual block diagram that illustrates an example configuration of an initiating device and an example configuration of a responding device.

FIG. 2 is a conceptual block diagram that illustrates an example configuration of initiating device 12 and an example configuration of responding device 16. In the example of FIG. 2, initiating device 12 includes a reporting system 50, a DCN interface 52, and a plurality of line cards 54A through 54N (collectively, "line cards 54"). In other examples, initiating device 12 includes only a single line card. Each of line cards 54 includes a plurality of ports 56. Line card 54A includes ports 56A through 56D and line card 54N includes ports 54W through 54Z. In other examples, one or more of line cards 54 may include a single port as opposed to multiple ports. The functionality of reporting system 50 is described below with regard to the example of FIG. 3.

In the example of FIG. 2, responding device 16 includes a multiplexing unit 58, a multiplex interface 60, a reporting system 62, a DCN interface 64, and a plurality of line cards 66A through 66N (collectively, line cards 66). In some examples, responding device 16 includes only a single line card. Each of line cards 66 includes a plurality of ports 66. In the example of FIG. 2, line card 66A includes ports 68A through 68D and line card 66N includes ports 66W through 66Z.

DCN interface 52 of initiating device 12 and DCN interface 64 of responding device 16 include circuitry that enable initiating device 12 and responding device 16 to send and receive data on DCN 22. In various examples, DCN interface 52 and DCN interface 64 are implemented in various ways. For example, DCN interface 52 and/or DCN interface 64 may be implemented as Ethernet network interface cards (NICs).

In the example of FIG. 2, each of ports 56 is physically connected to a different optical fiber. For instance, port 56A is physically connected to optical fiber 70, port 56D is physically connected to optical fiber 24, port 56W is physically connected to optical fiber 72, and port 56Z is physically connected to optical fiber 74. Opposite ends of optical fibers 70, 72, and 74 may be physically connected to ports of other devices in optical network 13. In other examples, one or more ports of initiating device 12 are not physically connected to any optical fiber.

In the example of FIG. 2, each of ports 68 is physically connected to a different optical fiber. For instance, port 68A is physically connected to optical fiber 24, port 68D is physically connected to optical fiber 76, port 68W is physically connected to optical fiber 78, and port 68Z is physically connected to optical fiber 80. Opposite ends of optical fibers 76, 78, and 80 may be physically connected to ports of other devices in optical network 13. In other examples, one or more ports of responding device 16 are not physically connected to any optical fiber. In other examples, optical fiber 24 may be connected to different ports of initiating device 12 and responding device 16.

When one of ports 68 of responding device 16 receives an optical signal, the line card associated with the port may forward the optical signal to multiplexing unit 58. Multiplexing unit 58 determines whether the optical signal includes an optical pulse pattern. If multiplexing unit 58 determines that the optical signal includes an optical pulse pattern, multiplexing unit 58 may route the optical pulse pattern to reporting system 62. In some examples, reporting system 62 may determine whether a data storage system stores a record that maps the optical pulse pattern to a device in optical network 13. In such embodiments, DCN interface 64 may send a report message on DCN 22 after reporting system 62 determines that the data storage system stores a record that maps the optical pulse pattern to another device in optical network 13. The report message may indicate that the other device is physically connected in optical network 13 to responding device 16. In other examples, reporting system 62 may send a pulse response message on DCN 22. In such examples, the pulse response message may indicate the optical pulse pattern received by responding device 16.

If an optical signal received by one of ports 68 does not include an optical pulse pattern, multiplexing unit 58 multiplexes the optical signal with optical signals received by other ones of ports 68 and directs the multiplexed optical signal to multiplex interface 60. Multiplex interface 60 is physically connected to optical fiber 28. Multiplex interface 60 sends the multiplexed optical signal on optical fiber 28. Thus, initiating device 12 may send and responding device 16 may receive a first wavelength-modulated signal on a first optical fiber (e.g., optical fiber 24) and device 14 may send and responding device 16 may receive a second wavelength-modulated signal on a second optical fiber. The first and second wavelength-modulated signals may have different carrier wavelengths. Multiplexing unit 58 multiplexes the first and second wavelength-modulated optical signals onto a third optical fiber (e.g., optical fiber 28) connected to responding device 16.

Figure 3:
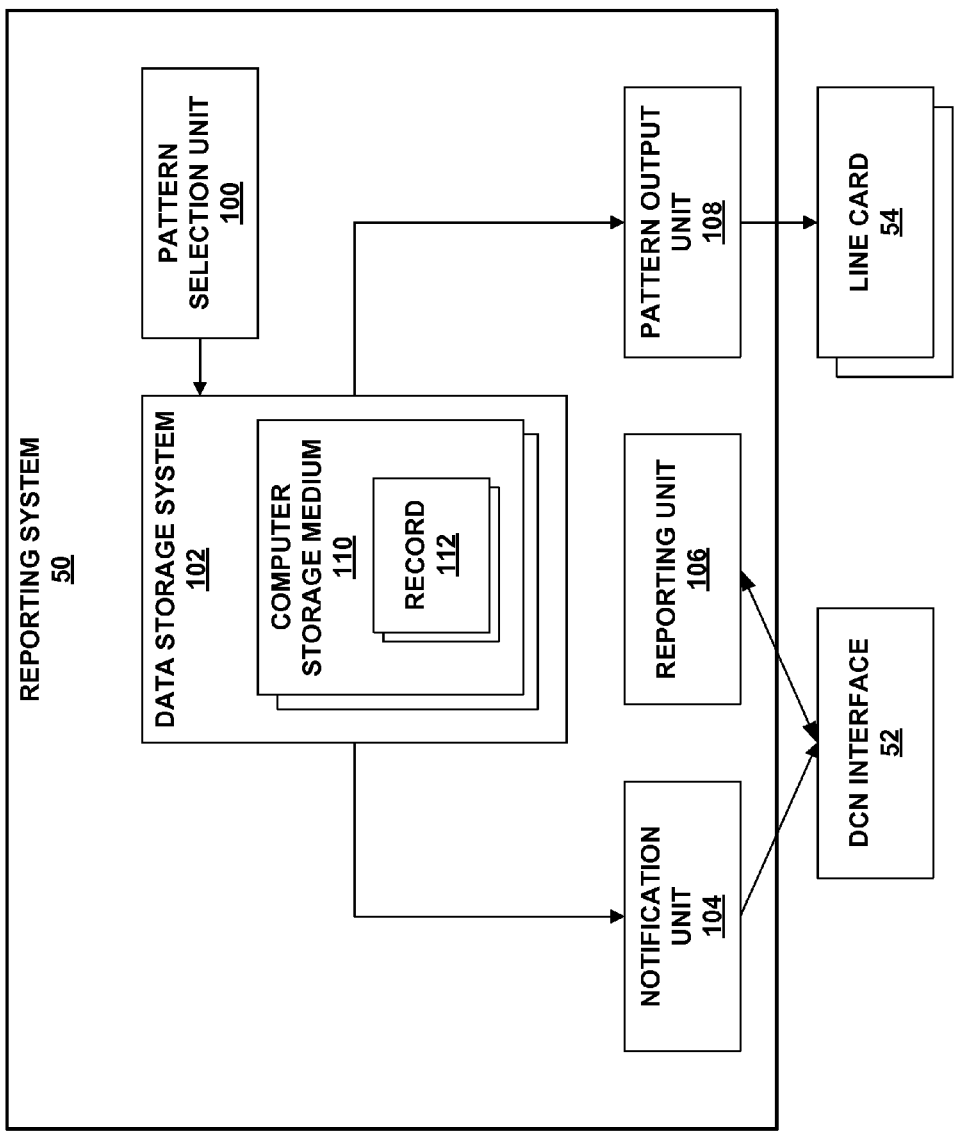
FIG. 3 is a conceptual block diagram that illustrates an example reporting system of the initiating device.

FIG. 3 is a conceptual block diagram that illustrates an example reporting system 50 of initiating device 12. As illustrated in the example of FIG. 3, reporting system 50 includes a pattern selection unit 100, a data storage system 102, a notification unit 104, a reporting unit 106, and a pattern output unit 108. In other examples, reporting system 50 may include more, fewer, or different components.

Data storage system 102 comprises one or more computer storage media 110. As used in this disclosure, a computer-readable medium is a medium from which a computer can read data. The term computer-readable media can refer to computer storage media and communications media. The term "computer storage media" may refer to physical devices that store data for subsequent retrieval. Computer storage media are not transitory. For instance, computer storage media do not exclusively comprise propagated signals. The term "computer storage media" may refer to volatile storage media and non-volatile storage media. Example types of computer storage media include random-access memory (RAM) units, read-only memory (ROM) devices, solid state memory devices, optical discs (e.g., compact discs, DVDs, BluRay discs, etc.), magnetic disk drives, magnetic tape drives, and other types of devices that store data for subsequent retrieval. Communication media include media over which one device can communicate data to another device. Example types of communication media include communication networks, communications cables, wireless communication links, communication buses, optical fibers, and other media over which one device is able to communicate data to another device.

In various examples, pattern selection unit 100, notification unit 104, reporting unit 106, and pattern output unit 108 may be implemented in various ways. For example, initiating device 12 may read instructions from one or more computer-readable media. In this example, execution of the instructions by a processor of initiating device 12 may cause initiating device 12 to provide the functionality of pattern selection unit 100, notification unit 104, reporting unit 106, and/or pattern output unit 108. In other examples, initiating device 12 comprises one or more application-specific integrated circuits (ASICs). In such examples, the ASICs may cause initiating device 12 to provide the functionality of pattern selection unit 100, notification unit 104, reporting unit 106, and/or pattern output unit 108.

Pattern selection unit 100 may select one or more optical pulse patterns. In some examples, pattern selection unit 100 stores records 112 in one or more of the computer storage media 110 in data storage system 102. The records 112 may include pulse pattern descriptors that describe the selected optical pulse patterns. Furthermore, in some examples, records 112 may include time identifiers that identify times at which initiating device 12 will send the selected optical pulse patterns.

Figure 7:
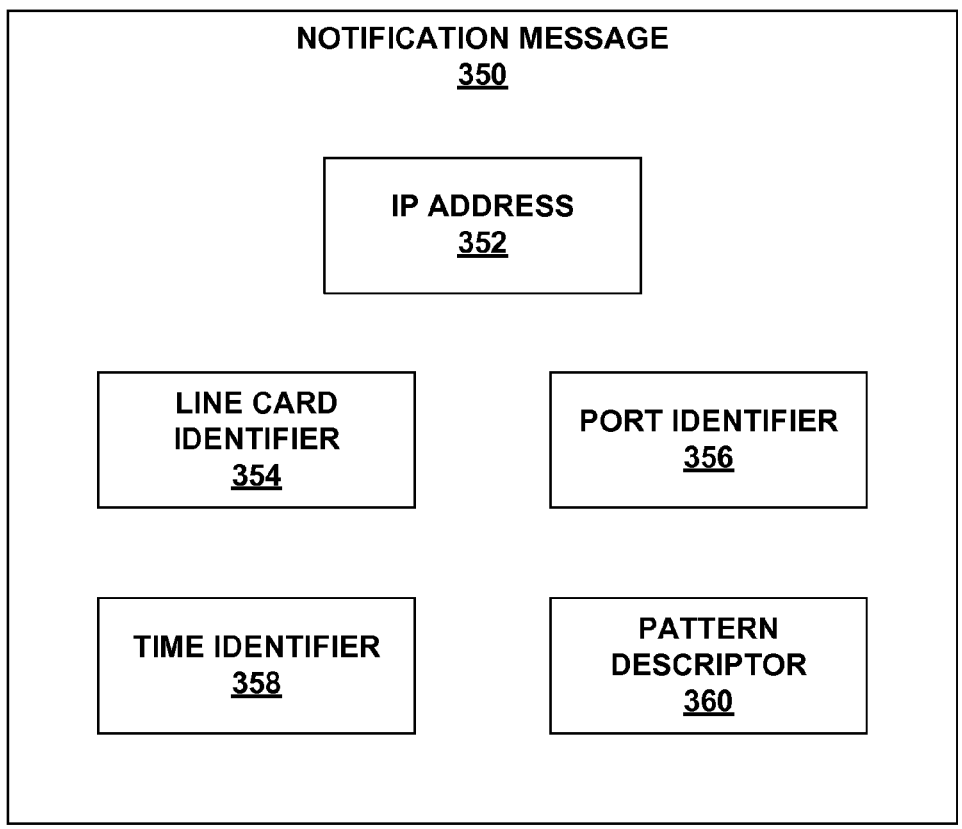
FIG. 7 is a conceptual block diagram of a notification message.

In some examples, notification unit 104 reads the pattern data from data storage system 102 and uses DCN interface 52 to send one or more notification messages on DCN 22. The notification messages may include a pulse pattern descriptor and data that identify initiating device 12. The pulse pattern descriptor describes an optical pulse pattern. In some examples, the notification messages may include port data that identify one of ports 56. In various examples, the port data identify one of ports 56 in various ways. For example, the port data may uniquely identify one of ports 56 by specifying an Internet Protocol (IP) address of initiating device 12, a line card identifier that identifies a given line card containing the port, and a port identifier that identifies the port among the ports in the given line card. In another example, the port data may specify a globally unique value that is unique among ports in optical network 13. FIG. 7, described in detail below, illustrates example elements of a notification message.

Figure 9:
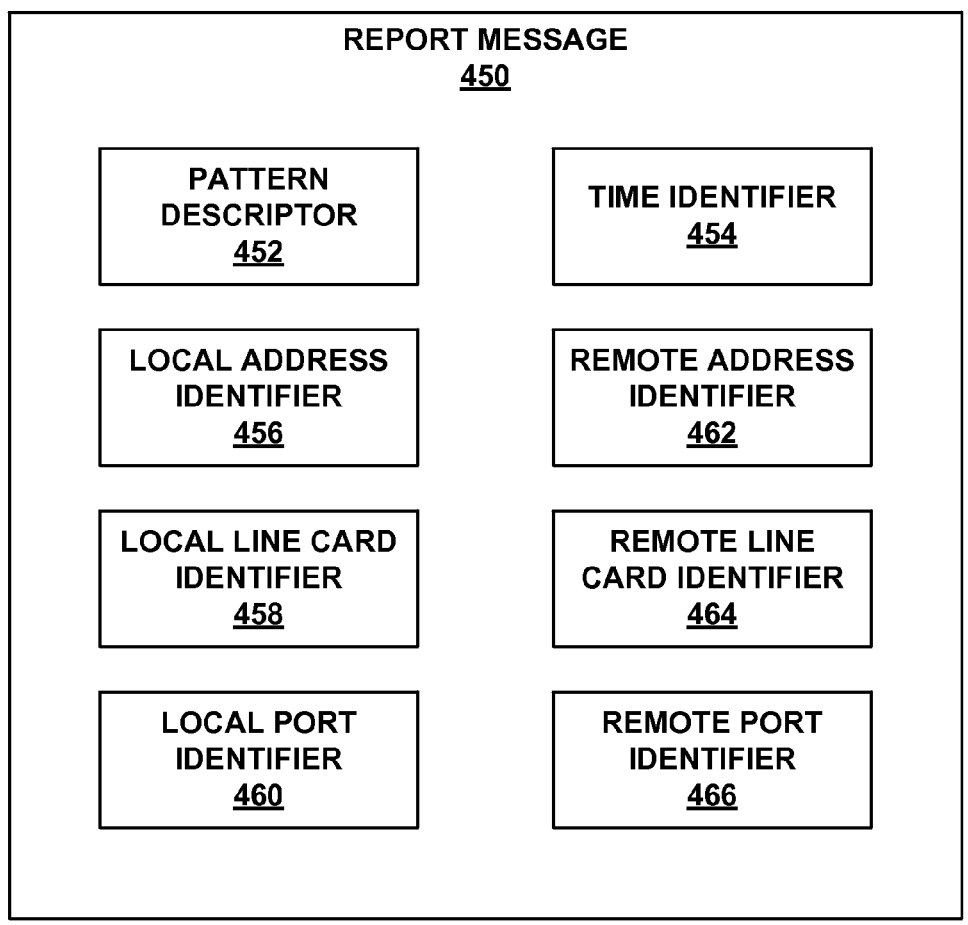
FIG. 9 is a conceptual block diagram of a report message.

In some examples, reporting unit 106 is configured to receive report messages sent on DCN 22 by responding device 16. Furthermore, reporting unit 106 may be configured to send a report message on DCN 22 in response to receiving a report message from responding device 16. If the report message received from responding device 16 indicates that a given port of responding device 16 is physically connected to a given port of initiating device 12, the report message sent by reporting unit 106 may indicate that the given port of initiating device 12 is physically connected to the given port of responding device 16. FIG. 9, described in detail elsewhere in this disclosure, illustrates example elements of a report message.

Pattern output unit 108 reads records 112 from data storage system 102. Pattern output unit 108 uses records 112 to cause ports 56 of initiating device 12 to send optical pulse patterns represented by records 112. For example, pattern output unit 108 may use records 112 to cause port 56D to send an optical pulse pattern on optical fiber 24.

Details regarding the operations of pattern selection unit 100, notification unit 104, reporting unit 106, and pattern output unit 108 are described in detail below with regard to the examples of FIGS. 6A-6C and 11-13.

Figure 4:
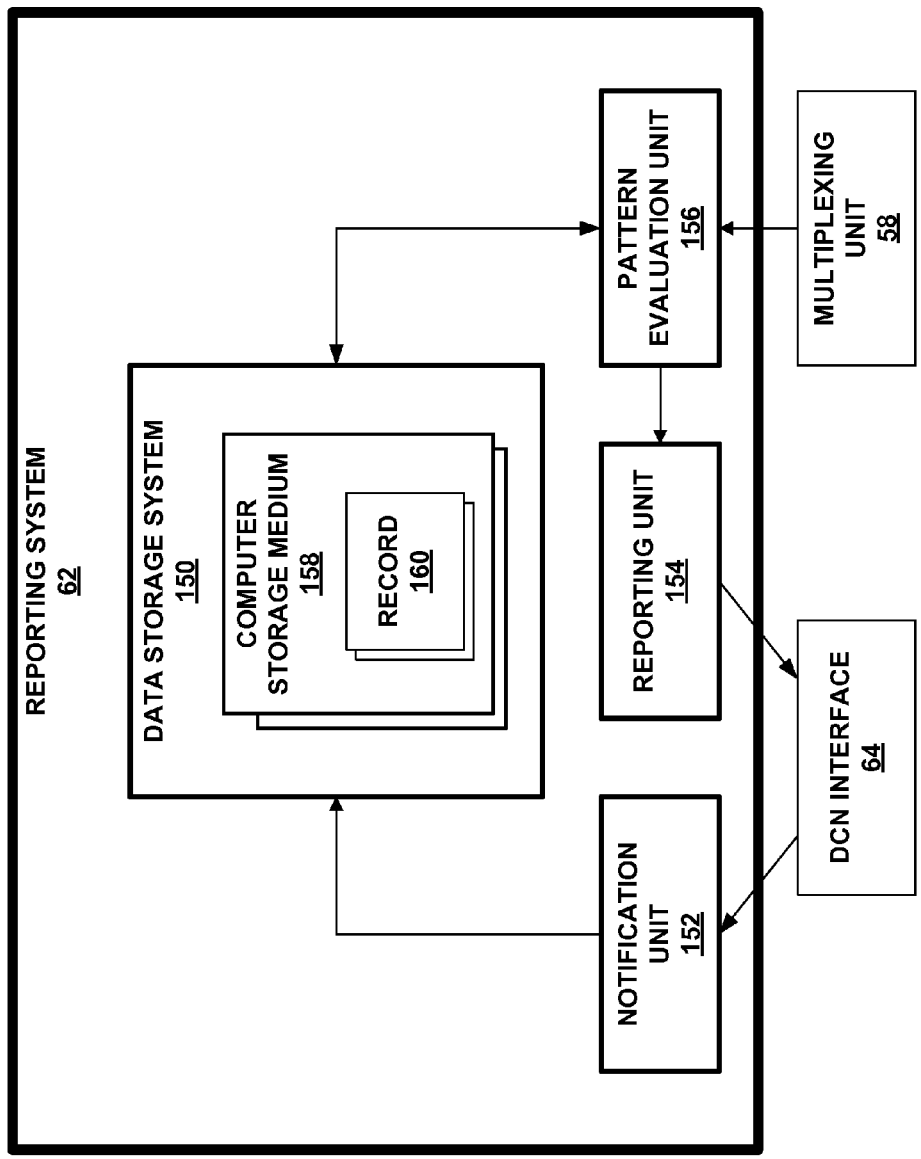
FIG. 4 is a conceptual block diagram that illustrates an example reporting system of the responding device.

FIG. 4 is a conceptual block diagram that illustrates an example configuration of reporting system 62 of responding device 16. In the example of FIG. 4, reporting system 62 comprises a data storage system 150, a notification unit 152, a reporting unit 154, and a pattern evaluation unit 156. Readers will understand that reporting system 62 may include more, fewer, or different components.

Figure 8:
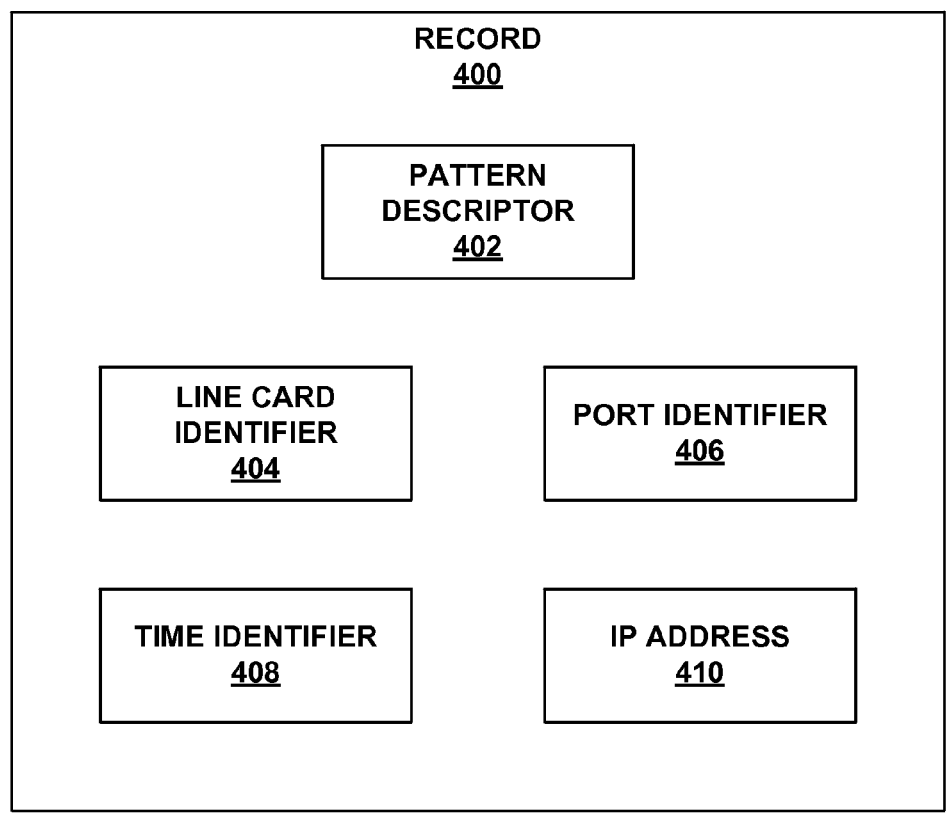
FIG. 8 is a conceptual block diagram of a record.

Data storage system 150 comprises one or more computer storage media 158. For example, computer storage media 158 may include one or more RAM units, solid state memory devices, magnetic disk drives, and/or other types of devices that store data for subsequent retrieval. Computer storage media 158 store records 160. As described in detail below, records 160 may correspond to optical pulse patterns. FIG. 8, described in detail elsewhere in this disclosure, illustrates example elements of a record.

In various examples, notification unit 152, reporting unit 154, and pattern evaluation unit 156 may be implemented in various ways. For example, a processor of responding device 16 may read instructions from one or more computer-readable media. In this example, execution of the instructions by the processor may cause responding device 16 to provide the functionality of notification unit 152, reporting unit 154, and/or pattern evaluation unit 156. In other examples, responding device 16 comprises one or more ASICs. In such examples, the ASICs may cause responding device 16 to provide the functionality of notification unit 152, reporting unit 154, and/or pattern evaluation unit 156.

In some examples, notification unit 152 is configured to receive notification messages sent on DCN 22. Each notification message may comprise a pulse pattern descriptor and data that identify other devices in optical network, such as initiating device 12. The pulse pattern descriptor describes an optical pulse pattern. In response to receiving a notification message, notification unit 152 may store a given record in data storage system 150. The given record corresponds to the optical pulse pattern described by the pulse pattern descriptor in the notification message.

In some examples, pattern evaluation unit 156 is configured to receive optical pulse patterns (or electronic data representing optical pulse patterns) from multiplexing unit 58. In response to receiving an optical pulse pattern (or equivalent electronic data), pattern evaluation unit 156 may determine whether the optical pulse pattern is mapped to another device in optical network 13 by determining whether data storage system 150 stores a record that corresponds to the optical pulse pattern. In some examples, pattern evaluation unit 156 may determine that the optical pulse pattern is mapped to another device in optical network 13 when a given record in data storage system 150 indicates the other device, includes a pulse pattern identifier that describes the optical pulse pattern, and includes a time identifier that specifies a time that corresponds to a current time. After pattern evaluation unit 156 determines that data storage system 150 stores a record that corresponds to the optical pulse pattern, pattern evaluation unit 156 may instruct reporting unit 154 to send a report message on DCN 22.

Details regarding the operations of notification unit 152, reporting unit 154, and pattern evaluation unit 156 are described in detail below with regard to the examples of FIGS. 6A-6C and 11-13.

Figure 5:
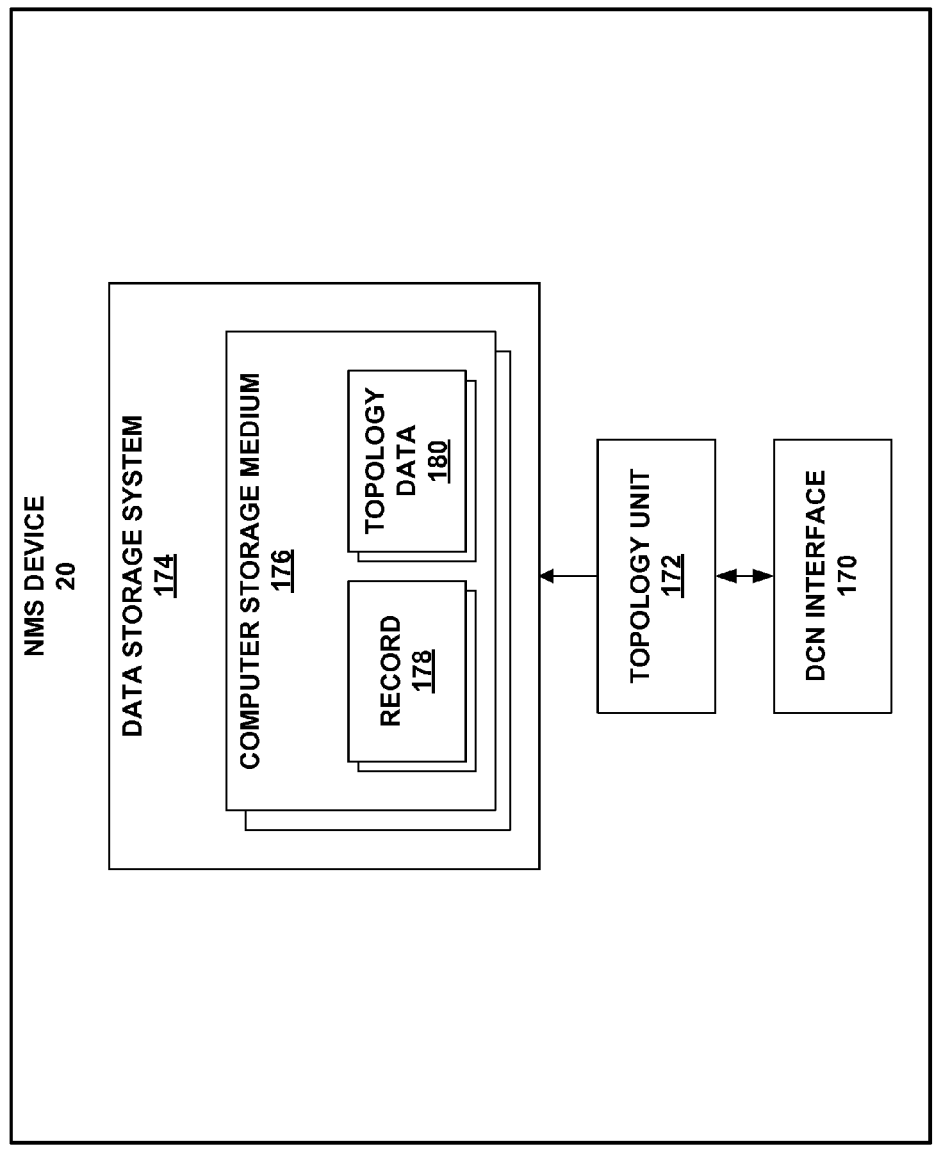
FIG. 5 is a conceptual block diagram that illustrates an example configuration of a network management system device.

FIG. 5 is a conceptual block diagram illustrating an example configuration of NMS device 20. In the example of FIG. 5, NMS device 20 includes a DCN interface 170, a topology unit 172, and a data storage system 174. Data storage system 174 includes one or more computer storage media 176. Computer storage media 176 may be any of the types of computer storage media described above with reference to FIGS. 3 and 4. In various examples, topology unit 172 may be implemented in various ways. For example, NMS device 20 may read instructions from one or more computer-readable media. In this example, execution of the instructions by a processor of NMS device 20 may cause NMS device 20 to provide the functionality of topology unit 172. In other examples, NMS device 20 comprises one or more application-specific integrated circuits (ASICs). In such examples, the ASICs may cause NMS device 20 to provide the functionality of topology unit 172.

DCN interface 170 enables NMS device 20 to send and receive data on DCN 22. As described in detail below, topology unit 172 may store records 178 in one or more computer storage media 176 of data storage system 174. Records 178 may include data based on messages sent over DCN 22 by devices in optical network 13. Furthermore, topology unit 172 may generate topology data 180 based on messages received from DCN 20. Topology data 180 may be stored in a same or different one of computer storage media 176 than records 178.

Figure 6A:
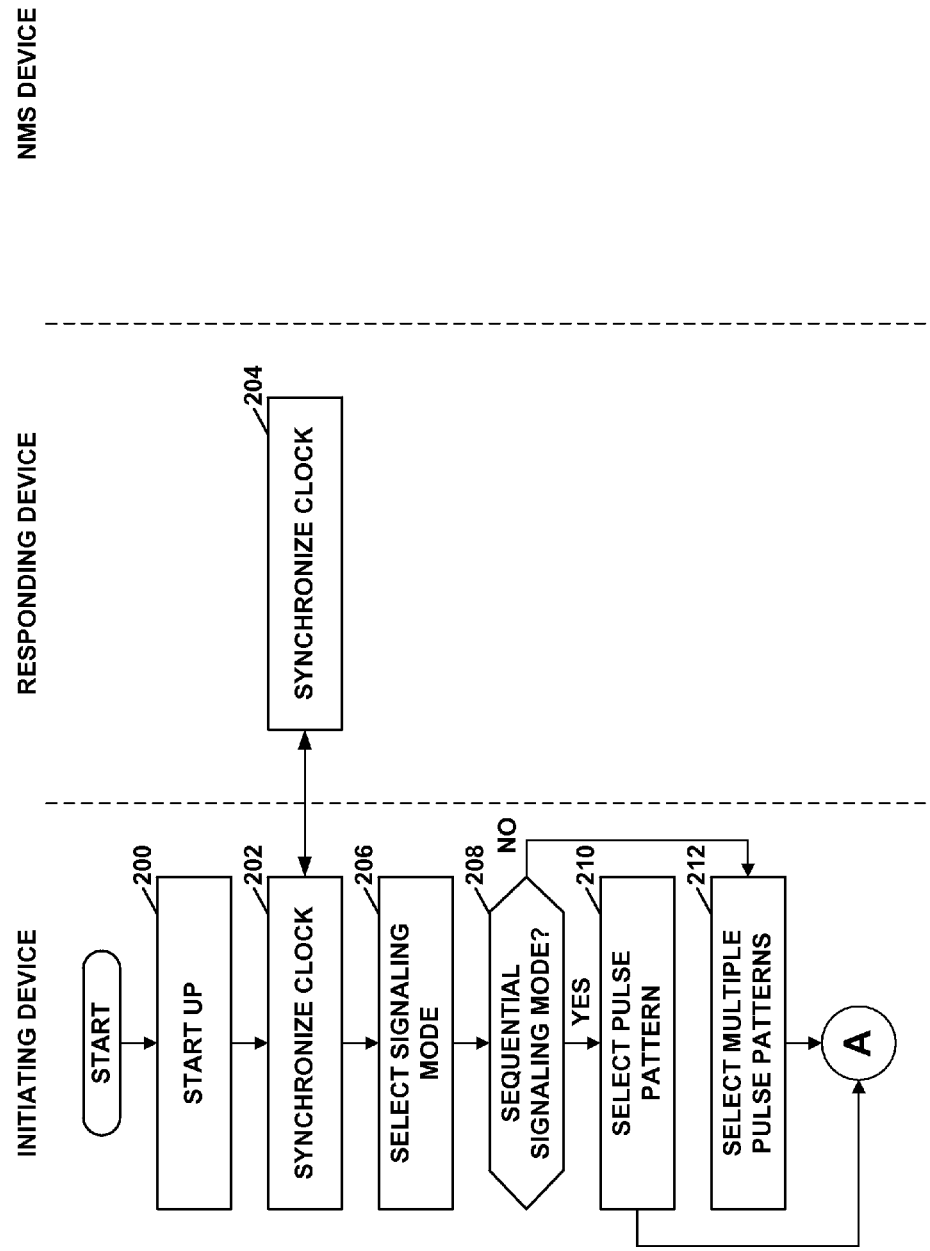
FIG. 6A is a flowchart that illustrates a first part of an exemplary set of operations for determining the topology of an optical network.

FIG. 6A is a flowchart that illustrates a first part of an exemplary set of operations for determining the topology of optical network 13. The operation of initiating device 12 begins when initiating device 12 starts up (200). After initiating device 12 starts up, initiating device 12 and responding device 16 may synchronize their clocks (202), (204). In various examples, initiating device 12 and responding device 16 synchronize their clocks in various ways. For example, initiating device 12 and responding device 16 may use the Network Time Protocol (NTP) to synchronize their clocks. As described below, initiating device 12 may send a notification message that specifies that initiating device 12 will send an optical pulse pattern at a specified time. Responding device 16 may determine that an optical fiber connects a given port of responding device 16 to a given port of initiating device 12 only if responding device 16 receives the specified optical pulse pattern at the specified time. Hence, it may be important for the clocks of initiating device 12 and responding device 16 to be synchronized.

Furthermore, after initiating device 12 starts up, pattern selection unit 100 may select a signaling mode (206). In example of FIG. 6A, pattern selection unit 100 may select a sequential signaling mode or a parallel signaling mode. In various examples, pattern selection unit 100 may select the signaling mode in various ways. For example, pattern selection unit 100 may select the signaling mode based on a configuration parameter set by an administrator of initiating device 12. In another example, pattern selection unit 100 may programmatically select the signaling mode based on one or more algorithmic rules. In yet other examples, pattern selection unit 100 does not select a signaling mode. Rather, in such examples, pattern selection unit 100 is only configured to use either the sequential signaling mode or the parallel signaling mode.

If pattern selection unit 100 selects or is otherwise configured to use the sequential signaling mode ("YES" of 208), pattern selection unit 100 selects a single optical pulse pattern (210). In various examples, initiating device 12 selects the optical pulse pattern in various ways. For example, pattern selection unit 100 may select the optical pulse pattern by choosing light source on/off times on a random or pseudorandom basis. Because it may be highly unlikely that two devices would randomly select the same optical pulse pattern and send the same randomly-selected optical pulse pattern at the same time, it may be unnecessary for devices in optical network 13 to communicate with each other to ensure that the devices do not send the same optical pulse pattern at the same time. In another example, pattern selection unit 100 may be preconfigured with one or more optical pulse patterns. In this example, pattern selection unit 100 may select one of the preconfigured optical pulse patterns.

Otherwise, if pattern selection unit 100 does not select the sequential signaling mode ("NO" of 208), pattern selection unit 100 selects multiple optical pulse patterns (212). In various examples, pattern selection unit 100 selects various numbers of optical pulse patterns. For example, pattern selection unit 100 may select different optical pulse patterns for each of ports 56. In other examples, pattern selection unit 100 may select a preconfigured or programmatically determined number of different optical pulse patterns. In various examples, pattern selection unit 100 may select the multiple optical pulse patterns in various ways. For example, pattern selection unit 100 may select the optical pulse patterns on a random or pseudorandom basis. In another example, pattern selection unit 100 may select the optical pulse patterns from among a set of preconfigured optical pulse patterns.

Figure 6B:
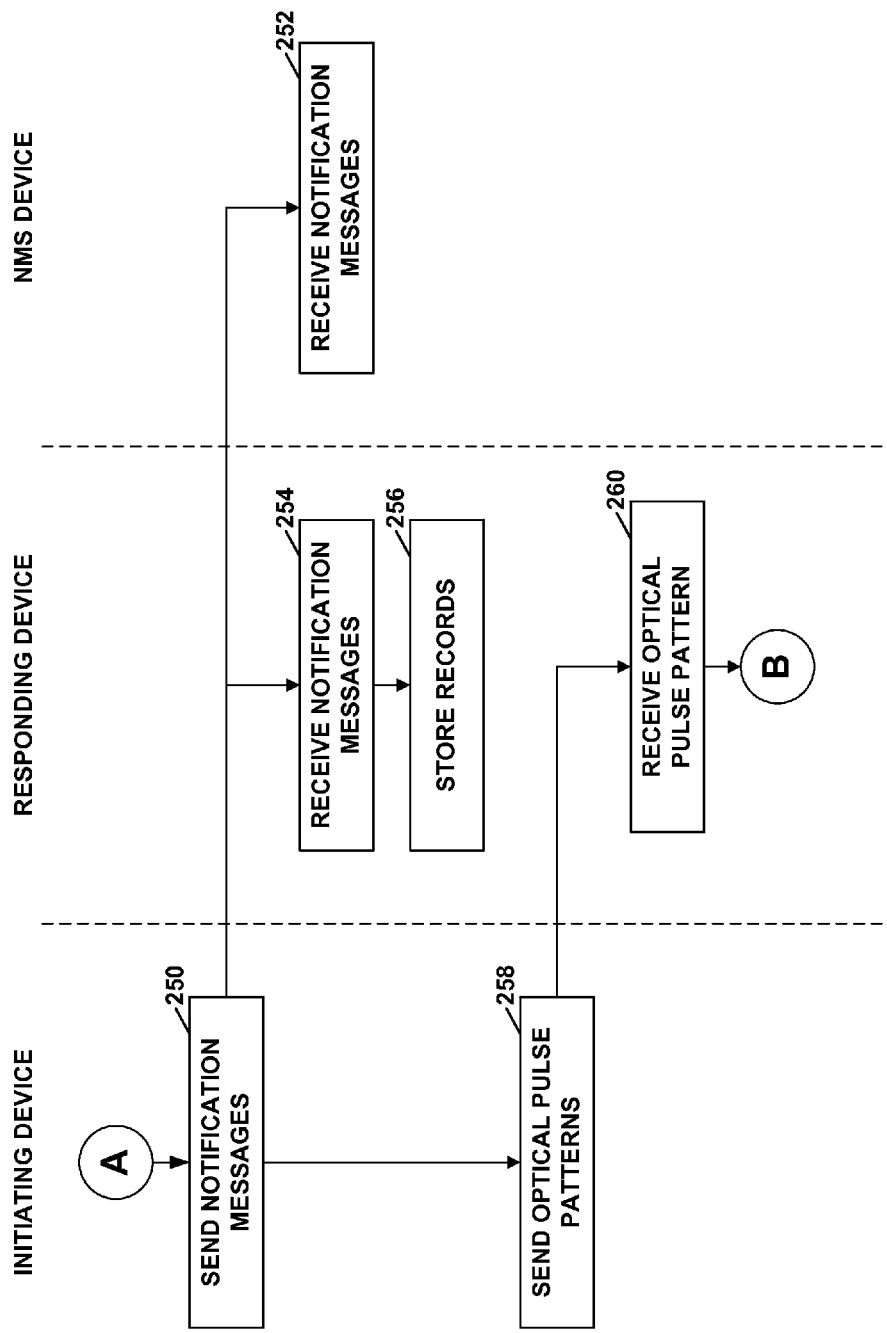
FIG. 6B is a flowchart that illustrates a second part of the exemplary set of operations of FIG. 6A.

FIG. 6B is a flowchart that illustrates a second part of the exemplary set of operations of FIG. 6A. After pattern selection unit 100 selects one or more optical pulse patterns, notification unit 104 may send one or more notification messages on DCN 22 (250). The notification messages may include different data that identify initiating device 12. Such data may include an IP address of initiating device 12. Furthermore, in some examples, the notification messages include port data that identify different ones of ports 56. In addition, each of the notification messages may include a pulse pattern descriptor and a time identifier.

If the sequential signaling mode is used, the pulse pattern descriptors of the notification messages describe the same optical pulse pattern. Furthermore, if the sequential signaling mode is used, the time identifiers of the notification messages specify different times. For example, one notification message may include a time identifier that specifies the time 11:30 a.m. on Oct. 9, 2011, another notification message may include a time identifier that specifies the time 11:31 a.m. on Oct. 9, 2011, and so on.

If the parallel signaling mode is used, the pulse pattern descriptors of the notification messages describe different optical pulse patterns. Furthermore, if the parallel signaling mode is used, the time identifiers of the notification messages may specify the same time. For example, each of the notification messages may include time identifiers that specify the time 11:30 a.m. on Oct. 9, 2011.

In various examples, the pulse pattern descriptors describe optical pulse patterns in various ways. For example, a pulse pattern descriptor may describe an optical pulse pattern by specifying a series of time offsets. Each of the time offsets corresponds to a time at which a light source turns on or off. In another example, a pulse pattern descriptor may describe an optical pulse pattern by specifying a series of time durations. Each of the time durations indicates a length of time that a light source remains on or off.

When notification unit 104 sends the notification messages on DCN 22, NMS device 20 may receive the notification messages (252). Furthermore, when notification unit 104 sends the notification messages on DCN 22, notification unit 152 in reporting system 62 of responding device 16 may receive the notification messages (254). Thus, responding device 16 receives a notification message on DCN 22 prior to receiving an optical pulse pattern described in the notification message. In response to receiving the notification messages, notification unit 152 may store records 160 in data storage system 150 (256). Records 160 may be associated with different ones of the notification messages. Thus, in response to receiving a notification message, notification unit 152 may store in data storage system 150 a record that corresponds to the optical pulse pattern described in the notification message. In some examples, notification unit 152 may store records in data storage system 150 in response to receiving notification messages sent by devices other than initiating device 12, e.g., device 14.

In some examples, when notification unit 152 stores a record associated with a given notification message, notification unit 152 may store the pulse pattern descriptor, the data identifying initiating device 12, the time identifier, and/or other information in the given notification message in the record. In this way, the record maps the optical pulse pattern described by the pulse pattern descriptor to initiating device 12.

In various examples, notification unit 152 stores the records in data storage system 150 in various ways. For example, notification unit 152 may store the records in a relational database. In another example, notification unit 152 may store the records as entries in a table data structure. In yet another example, notification unit 152 may store the records in various types of tree data structures.

After notification unit 104 of initiating device 12 sends the notification messages, pattern output unit 108 of initiating device 12 causes light sources associated with ports 56 to send appropriate optical pulse patterns at appropriate times (258). For instance, if notification unit 152 sent a notification message that includes a time identifier that specifies a given time at which initiating device 12 will send a given optical pulse pattern on a given port, pattern output unit 108 may cause a light source associated with the given port to send the given optical pulse pattern at the time specified by the time identifier.

If the sequential signaling mode is used, pattern output unit 108 may cause initiating device 12 to send a given optical pulse pattern on a first optical fiber connected to a first port of initiating device 12. Furthermore, pattern output unit 108 may cause initiating device 12 to send the same given optical pulse pattern on a second optical fiber after sending the given optical pulse pattern on the first optical fiber, the second optical fiber connected to a second port of initiating device 12.

If the parallel signaling mode is used, pattern output unit 108 may cause light sources associated with ports 56 to output different optical pulse patterns concurrently. For example, pattern output unit 108 may cause initiating device 12 to send a first optical pulse pattern on a first optical fiber concurrent with sending a second optical pulse pattern on a second optical fiber. In this example, the first optical fiber may be connected to a first port of initiating device 12 and the second optical fiber may be connected to a second port of initiating device 12. The first optical pulse pattern may be different than the second optical pulse pattern.

When pattern output unit 108 causes a light source associated with a given one of ports 56 to send an optical pulse pattern, one of ports 68 of responding device 16 may receive the optical pulse pattern (260). The example operations of initiating device 12, responding device 16, and NMS device 20 continue in FIG. 6C.

FIG. 6C is a flowchart that illustrates a third part of the exemplary set of operations of FIGS. 6A and 6B. After responding device 16 receives an optical pulse pattern on one of ports 68, pattern evaluation unit 156 in reporting system 62 of responding device 16 may determine whether the optical pulse pattern corresponds to one of records 160 in data storage system 150 (300). Pattern evaluation unit 156 may determine that a given record corresponds to the optical pulse pattern when the given record comprises a pulse pattern descriptor that describes the optical pulse pattern and comprises a time identifier that specifies a time that corresponds to the current time. In some examples, the time specified by a record may correspond to the current time if the difference between the specified time and the current time is less than a given threshold, e.g., 500 milliseconds, 1 second, etc.

If pattern evaluation unit 156 determines that data storage system 150 does not include a record that corresponds to the received optical pulse pattern ("NO" of 300), pattern evaluation unit 156 may ignore the optical pulse pattern (302). In other examples, responding device 16 may perform other actions if the optical pulse pattern does not correspond to a record in data storage system 150. For example, responding device 16 may output an alert message on DCN 22 when the optical pulse pattern does not correspond to a record in data storage system 150.

On the other hand, if pattern evaluation unit 156 determines that data storage system 150 includes a record that corresponds to the received optical pulse pattern ("YES" of 300), reporting unit 154 sends a report message on DCN 22 (304). If the record maps the received optical pulse pattern to a given device in optical network 13, the report message may indicate that responding device 16 is physically connected in optical network 13 to the given device. Furthermore, in some examples, the report message may indicate that the port on which responding device 16 received the optical pulse pattern is physically connected in optical network 13 to the indicated port of the given device.

In various examples, report messages may indicate that a first device is physically connected in optical network 13 to a second device in various ways. For example, a report message may indicate that the first device is physically connected in optical network 13 to the second device by specifying an IP address of the first device and an IP address of the second device. Furthermore, the report message may indicate that a port of the first device is physically connected to a port of the second device by specifying port data that identify the port of the first device and port data that identify the port of the second device. The port data that identify a given port may include an IP address of a device that includes the given port, an identifier of a line card that contains the given port, and an identifier of the given port among the ports of the line card.

In some examples, the report message includes additional information. For example, the report message may include a pulse pattern descriptor that describes the received pulse pattern. Furthermore, in other examples, the report message may include a time identifier that identifies a time at which responding device 16 received the optical pulse pattern.

When reporting unit 154 of responding device 16 sends the report message on DCN 22, NMS device 20 may receive the report message (306). In addition, when reporting unit 154 of responding device 16 sends the report message on DCN 22, initiating device 12 may receive the report message (308). Thus, initiating device 12 may receive the report message on DCN 22 after sending an optical pulse pattern on an optical fiber connected to one of ports 56.

If the sequential signaling mode is used, initiating device 12 sequentially sends out the same optical pulse pattern on optical fibers connected to different ones of ports 56. Hence, initiating device 12 may receive a first report message on DCN 22 after sending the optical pulse pattern on an optical fiber connected to a first port of initiating device 12. The first report message may indicate that a given port of responding device 16 is physically connected to the first port of initiating device 12. In addition, initiating device 12 may receive a second report message on DCN 22 after sending the optical pulse pattern on an optical fiber connected to a second port. The second report message may indicate that a port of another device is physically connected to the second port of initiating device 12.

If the parallel signaling mode is used, initiating device 12 concurrently sends different optical pulse patterns on optical fibers connected to different ones of ports 56. Hence, initiating device 12 may receive a first report message on DCN 22 after sending a first optical pulse pattern on an optical fiber connected to a first port of initiating device 12. The first report message may indicate that a given port of responding device 16 is physically connected to the first port of initiating device 12. In addition, initiating device 12 may receive a second report message on DCN 22 after sending a second optical pulse pattern on an optical fiber connected to a second port of initiating device 12. The second report message may indicate that a port of another device is physically connected to the second port of initiating device 12.

Reporting unit 106 of initiating device 12 may send a report message on DCN 22 in response to receiving the report message sent by responding device 16 (310). In various examples, the report message sent by initiating device 12 includes various data. For instance, if the report message sent by responding device 16 specifies that a given port of responding device 16 is physically connected to a given port of initiating device 12, the report message sent by initiating device 12 may indicate that the given port of initiating device 12 is physically connected to the given port of responding device 16. In some examples, the report message sent by initiating device 12 includes additional data, such as a pulse pattern descriptor, a time identifier, and/or other data.

When initiating device 12 sends the report message on DCN 22, responding device 16 may receive the report message from initiating device 12 (312). In addition, when initiating device 12 sends the report message on DCN 22, NMS device 20 may receive the report message from initiating device 12 over DCN 22 (314). In this way, NMS device 20 may receive report messages from both responding device 16 and/or initiating device 12. After NMS device 20 receives the report messages from responding device 16 and initiating device 12, topology unit 172 of NMS device 20 may use either or both of the report messages to generate topology data 180 (316). Topology data 180 indicates how devices in optical network 13 are connected to one another. For example, topology data 180 may indicate that initiating device 12 is connected in optical network 13 to responding device 16. In other alternative implementations, responding device 16 does not send the report message on DCN 22. Rather, in such alternate implementations, responding device 16 may generate topology data 180. Responding device 16 may then send topology data 180 to one or more devices on DCN 22. In such alternate implementations, it may not be necessary for NMS device 20 to be present.

FIG. 7 is a conceptual block diagram of a notification message 350. In the example of FIG. 7, notification message 350 includes an address identifier 352, a line card identifier 354, a port identifier 356, a time identifier 358, and a pulse pattern descriptor 360. In other examples, notification messages may include more, fewer, or different elements.

Address identifier 352 specifies an IP address of the device that sends notification message 350. For example, if initiating device 12 sends notification message 350, address identifier 352 specifies an IP address of initiating device 12. Line card identifier 354 identifies a given line card of the sending device. The given line card includes the port on which the sending device will send an optical pulse pattern. Port identifier 356 specifies the port on which the sending device will send the optical pulse pattern. Address identifier 352, line card identifier 354, and port identifier 356 may collectively be "port data" that identifies the port. Time identifier 358 specifies a time at which the sending device will send the optical pulse pattern. Pulse pattern descriptor 360 describes the optical pulse pattern.

FIG. 8 is a conceptual block diagram of a record 400. Record 400 may be one of records 160 stored in data storage system 158 of responding device 16. As illustrated in the example of FIG. 8, record 400 comprises a pulse pattern descriptor 402, a line card identifier 404, a port identifier 406, a time identifier 408, and an address identifier 410. In other examples, records 160 may include more, fewer, or different elements.

Pulse pattern descriptor 402 describes an optical pulse pattern. Line card identifier 404 identifies a given line card of a device that will send the optical pulse pattern. Port identifier 406 specifies a given port of the given line card. Time identifier 408 identifies a time at which the sending device will send the optical pulse pattern on the given port. Address identifier 410 specifies the IP address of the sending device. IP address 410, line card identifier 404, and port identifier 406 may collectively be "port data" that identify the given port.

FIG. 9 is a conceptual block diagram of a report message 450. In some examples, initiating device 12 or responding device 16 send report messages having elements similar to those shown in report message 450. In the example of FIG. 9, report message 450 includes a pulse pattern descriptor 452, a time identifier 454, a local address identifier 456, a local line card identifier 458, a local port identifier 460, a remote address identifier 462, a remote line card identifier 464, and a remote port identifier 466. In other examples, report message 450 may include more, fewer, or different elements.

Pulse pattern descriptor 452 describes an optical pulse pattern. Time identifier 454 identifies a time at which the optical pattern was sent and/or received. Local address identifier 456 specifies the IP address of the device that is sending report message 450. Local line card identifier 458 identifies a given line card of the sending device. Local port identifier 460 identifies a port of the given line card of the sending device. Local address identifier 456, local line card identifier 458, and local port identifier 460 may collectively be "port data" that identify the port of the sending device.

Remote address identifier 462 specifies an IP address of a device connected to the sending device. Remote address identifier 462 specifies the IP address of the connected device. Remote line card identifier 464 identifies a line card of the connected device. Remote port identifier 466 identifies a port of the line card of the connected device. Remote address identifier 462, remote line card identifier 464, and remote port identifier 466 may collectively be "port data" that identify the port of the connected device.

Figure 10:
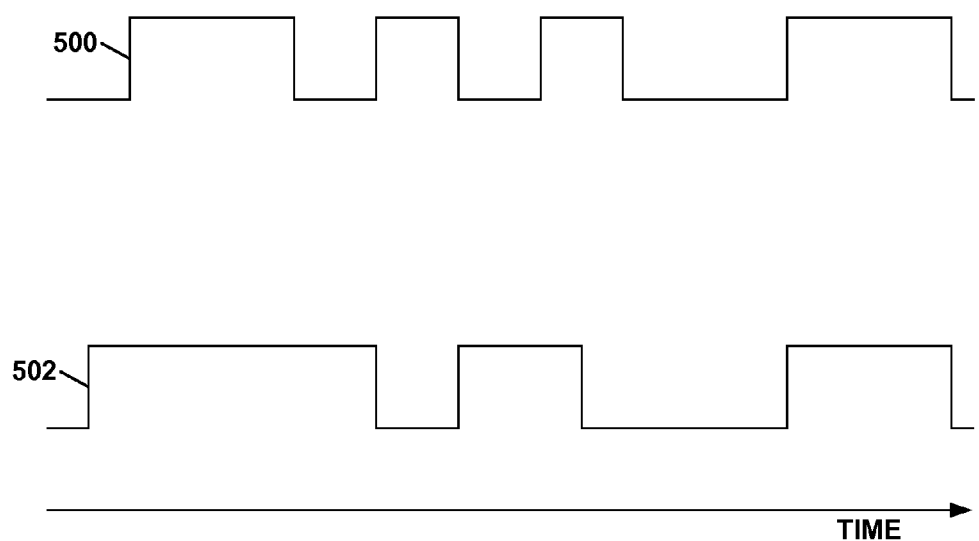
FIG. 10 is a conceptual diagram that illustrates example optical pulse patterns.

FIG. 10 is a conceptual diagram that illustrates example optical pulse patterns 500 and 502. In the example of FIG. 10, elevated portions of optical pulse patterns 500 and 502 indicate times at which a light source is on and lower portions of optical pulse patterns 500 and 502 indicate times at which the light source is off.

Figure 11:
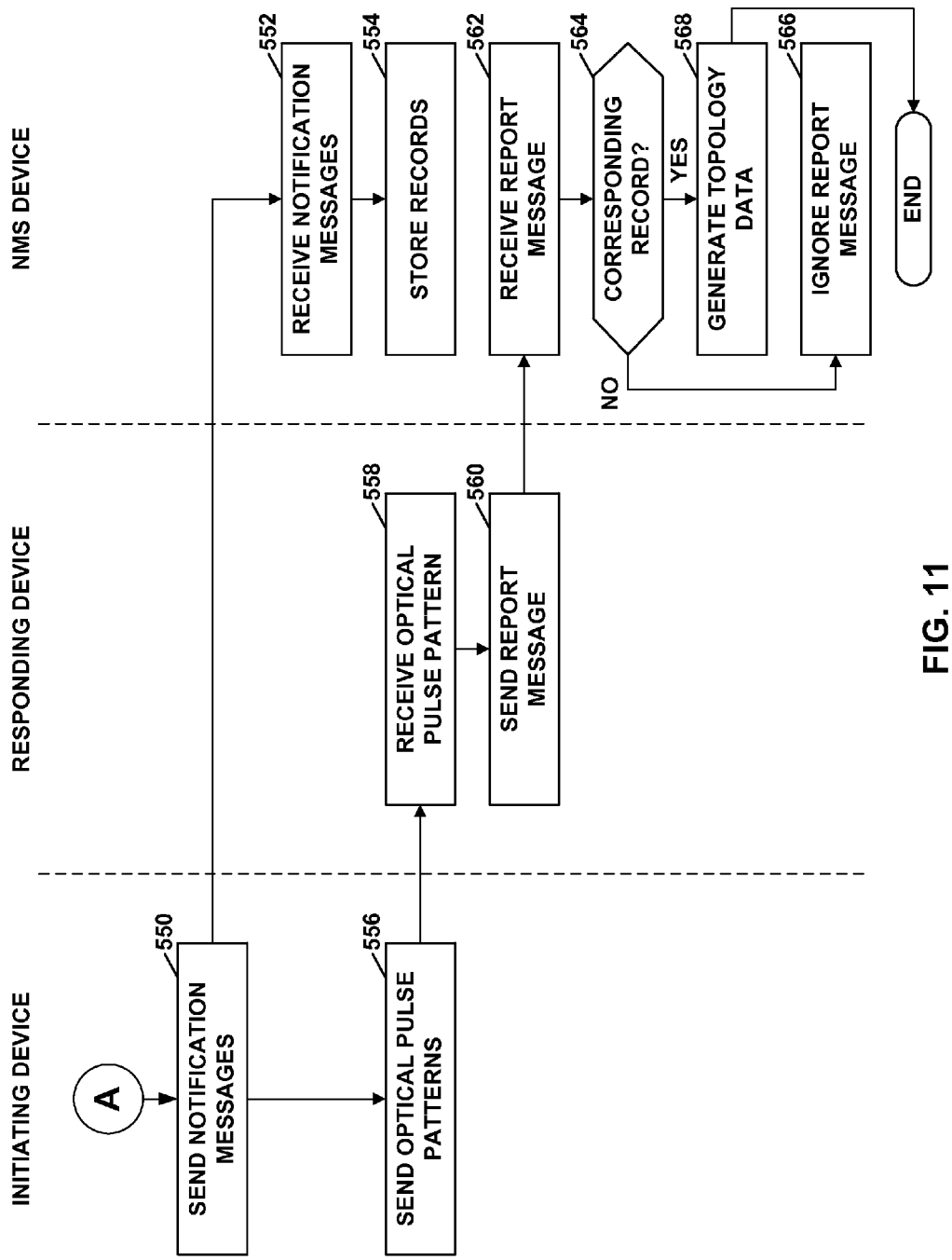
FIG. 11 is a flowchart that illustrates another exemplary set of operations for determining the topology of the optical network.

FIG. 11 is a flowchart that illustrates another exemplary set of operations for determining the topology of optical network 13. In the example of FIG. 11, initiating device 12 does not send a report message in response to receiving a report message sent by responding device 16. Rather, NMS device 20 may determine that initiating device 12 is physically connected in optical network 13 to responding device 16 based on information in a notification message sent by initiating device 12 and information in the report message sent by responding device 16. In the example of FIG. 11, the operations of initiating device 12, responding device 16, and NMS device 20 may be continuations of the operations shown in the example of FIG. 6A.

As illustrated in the example of FIG. 11, notification unit 104 of initiating device 12 may send one or more notification messages on DCN 22 after pattern selection unit 100 selects one or more optical pulse patterns (550). In various examples the notification messages include various elements. For example, the notification messages may include the elements shown in the example of FIG. 7. In other examples, the notification messages may include more, fewer, or different elements.

After initiating device 12 sends the one or more notification messages, NMS device 20 receives the notification messages (552). In response to receiving the notification messages, NMS device 20 stores records 178 in data storage system 174 (554). Records 178 may specify the information contained in the notification messages.

Furthermore, after initiating device 12 sends the notification messages, pattern output unit 108 of initiating device 12 causes light sources associated with ports 56 to send appropriate optical pulse patterns at appropriate times (556). For instance, if notification unit 104 sent a notification message that includes a time identifier that specifies a given time at which initiating device 12 will send a given optical pulse pattern, pattern output unit 108 may cause a light source associated with a given port of initiating device 12 to send the given optical pulse pattern at the time specified by the time identifier.

Subsequently, one of ports 68 of responding device 16 may receive an optical pulse pattern (558). Reporting unit 154 of responding device 16 may send a report message on DCN 22 in response to receiving the optical pulse pattern (560). In various examples, the report message may include various elements. For example, the report message may include a pulse pattern descriptor that describes the optical pulse pattern received by responding device 16. Furthermore, in some examples, the report message may include a time identifier that identifies a time at which responding device 16 received the optical pulse pattern. Furthermore, in some examples, the report message may include data, such as an IP address, that identifies responding device 16. In some examples, the report message may also include appropriate line card and port identifiers.

After responding device 16 sends the report message on DCN 22, NMS device 20 may receive the report message from DCN 22 (562). After NMS device 20 receives the report message, NMS device 20 may determine whether any of records 178 in data storage system 174 correspond to the report message (564). In various examples, NMS device 20 may determine that a record corresponds to the report message when the record satisfies a given condition. For example, the given condition may require the record to include a pulse pattern descriptor that describes the optical pulse pattern described in the report message. Furthermore, in this example, the given condition may require the record to include a time identifier that identifies a time that corresponds to a time identified by the report message.

If none of records 178 corresponds to the report message ("NO" of 564), NMS device 20 may ignore the report message (566). Otherwise, if data storage system 174 includes a record that corresponds to the report message ("YES" of 564), topology unit 172 of NMS device 20 may generate topology data 180 using information in the corresponding record and information in the report message (566). For example, topology unit 172 may use device identification data in the corresponding record and device identification data in the report message to generate topology data 180 that indicates that initiating device 12 is physically connected in optical network 13 to responding device 16. In some examples the report message specifies a port of initiating device 12 and a port of responding device 16. In such examples, topology data 180 may indicate that the specified port of initiating device 12 is connected in optical network 13 to the specified port of responding device 16.

Figure 12:
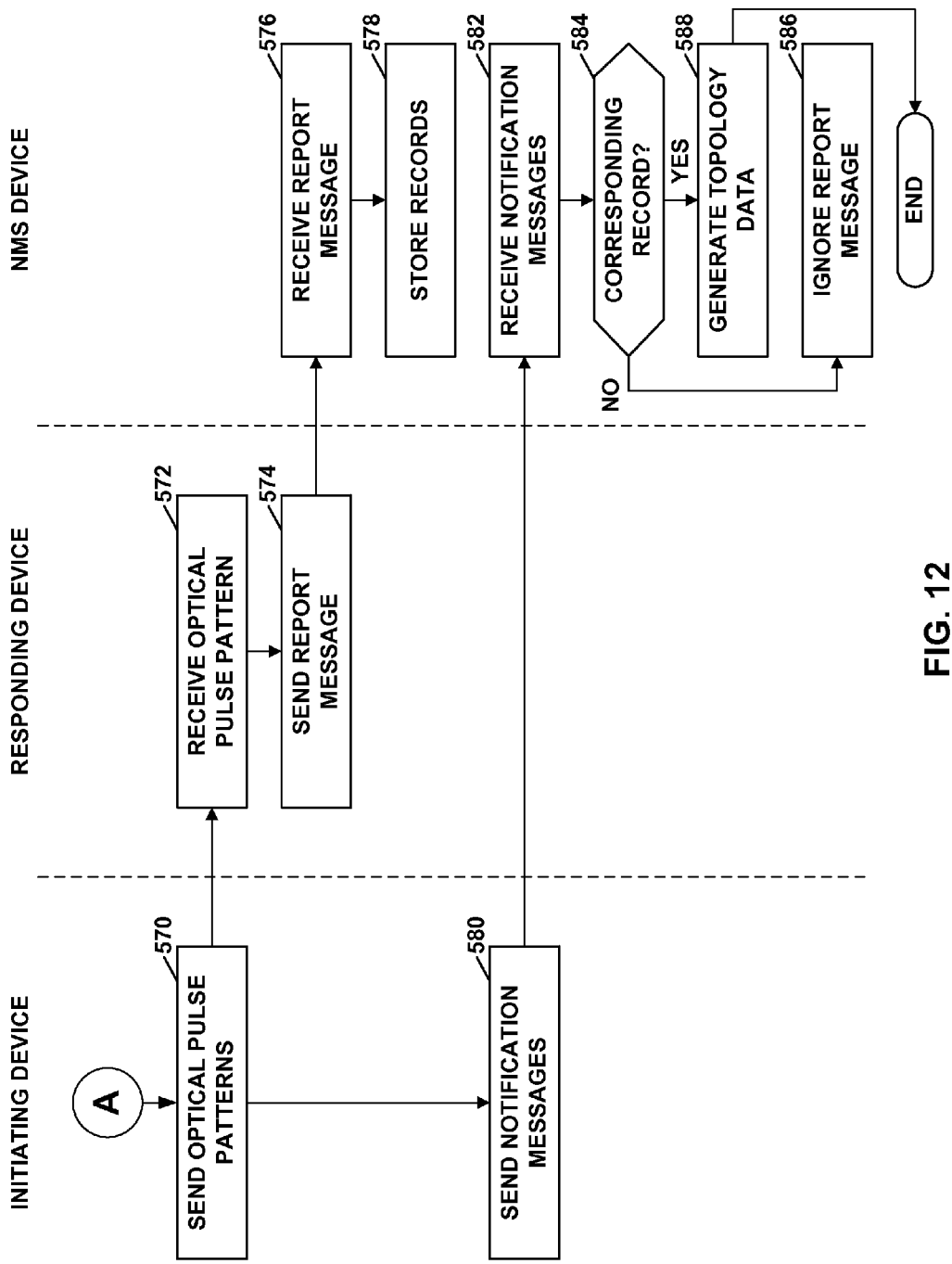
FIG. 12 is a flowchart that illustrates yet another exemplary set of operations for determining the topology of the optical network.

FIG. 12 is a flowchart that illustrates yet another exemplary set of operations for determining the topology of optical network 13. In the example of FIG. 12, initiating device 12 does not send a report message in response to receiving a report message sent by responding device 16. Rather, NMS device 20 may determine that initiating device 12 is physically connected in optical network 13 to responding device 16 based on information in a notification message sent by initiating device 12 and information in the report message sent by responding device 16. Unlike the exemplary set of operations illustrated in FIG. 11, initiating device 12 sends notification messages after sending optical pulse patterns. In the example of FIG. 12, the operations of initiating device 12, responding device 16, and NMS device 20 may be continuations of the operations shown in the example of FIG. 6A.

As illustrated in the example of FIG. 12, pattern output unit 108 of initiating device 12 causes light sources associated with ports 56 to send appropriate optical pulse patterns at appropriate times (570). Subsequently, one of ports 68 of responding device 16 may receive an optical pulse pattern (572). Reporting unit 154 of responding device 16 may send a report message on DCN 22 in response to receiving the optical pulse pattern (574). In various examples, the report message may include various elements. For example, the report message may include a pulse pattern descriptor that describes the optical pulse pattern received by responding device 16. Furthermore, in some examples, the report message may include a time identifier that identifies a time at which responding device 16 received the optical pulse pattern. Furthermore, in some examples, the report message may include data, such as an IP address, that identifies responding device 16. In some examples, the report message may also include appropriate line card and port identifiers.

After responding device 16 sends the report message on DCN 22, NMS device 20 may receive the report message from DCN 22 (576). In response to receiving the notification messages, topology unit 172 of NMS device 20 stores records 178 (578). Records 178 may specify the information contained in the notification messages.

After initiating device 12 sends one or more of the optical pulse patterns, initiating device 12 may send one or more notification messages on DCN 22 after pattern selection unit 100 selects one or more optical pulse patterns (580). In various examples the notification messages include various elements. For example, the notification messages may include the elements shown in the example of FIG. 7. In other examples, the notification messages may include more, fewer, or different elements.

After initiating device 12 sends the one or more notification messages, NMS device 20 may receive the notification messages (582). In response to receiving the notification messages, topology unit 172 of NMS device 20 may determine whether any of records 178 in data storage system 174 correspond to the report message (584). In various examples, topology unit 172 may determine that a record corresponds to the report message when the record satisfies a given condition. For example, the given condition may require the record to include a pulse pattern descriptor that describes the optical pulse pattern described in the report message. Furthermore, in this example, the given condition may require the record to include a time identifier that identifies a time that corresponds to a time identified by the report message.

If none of records 178 corresponds to the report message ("NO" of 584), NMS device 20 may ignore the report message (586). Otherwise, if data storage system 174 includes a record that corresponds to the report message ("YES" of 584), NMS device 20 may generate topology data 180 using information in the corresponding record and information in the report message (588). For example, NMS device 20 may use device identification data in the corresponding record and device identification data in the report message to generate topology data 180 that indicates that initiating device 12 is physically connected in optical network 13 to responding device 16. In some examples the report message specifies a port of initiating device 12 and a port of responding device 16. In such examples, topology data 180 may indicate that the specified port of initiating device 12 is connected in optical network 13 to the specified port of responding device 16.

Figure 13:
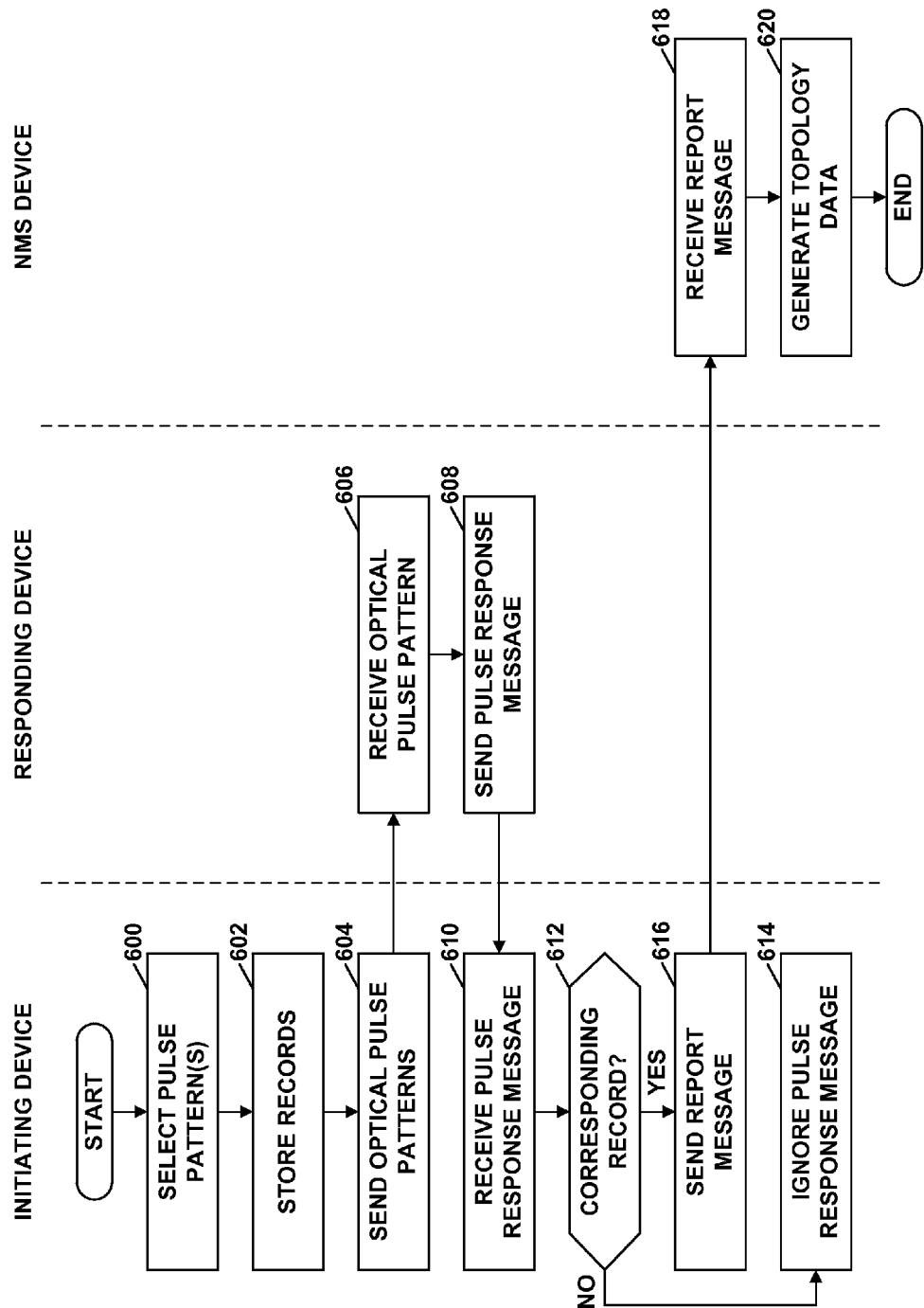
FIG. 13 is a flowchart that illustrates yet another exemplary set of operations for determining the topology of the optical network.

FIG. 13 is a flowchart that illustrates yet another exemplary set of operations for determining the topology of optical network 13. In the example of FIG. 13, initiating device 12 does not necessarily send notification messages prior to outputting optical pulse patterns. Rather, in the example of FIG. 13, initiating device 12 uses a report message sent by responding device 16 to determine whether initiating device 12 is physically connected in optical network 13 to responding device 16.

As illustrated in the example of FIG. 13, pattern selection unit 110 may select one or more optical pulse patterns (600). If initiating device 12 is using the sequential signaling mode, pattern selection unit 110 may select a single optical pulse pattern. If initiating device 12 is using the parallel signaling mode, pattern selection unit 110 may select multiple optical pulse patterns. Pattern selection unit 110 may select the optical pulse patterns in any of the example ways described above.

After selecting the one or more optical pulse patterns, pattern output unit 108 may store one or more records 112 in data storage system 102 of initiating device 12 (602). If initiating device 12 is using the sequential signaling mode, records 112 may specify different ports 56 of initiating device 12 and times at which initiating device 12 will send the optical pulse pattern on the specified ports 56. If initiating device 12 is using the parallel signaling mode, each of records 112 may specify a different optical pulse pattern and a port 56 on which initiating device 12 will output the specified optical pulse pattern.

After storing records 112, pattern output unit 108 may cause light sources associated with ports 56 to send appropriate optical pulse patterns at appropriate times (604). In various examples, pattern output unit 108 may output the optical pulse patterns using the sequential or parallel signaling modes as described above. In contrast to the example operations of FIGS. 6A-6C, FIG. 11, and FIG. 12, initiating device 12 does not send notification messages on DCN 22 before or after sending the optical pulse patterns.

Subsequently, one of ports 68 of responding device 16 may receive an optical pulse pattern (606). In response to receiving the optical pulse pattern, responding device 16 sends a pulse response message on DCN 22 (608). When responding device 16 sends the pulse response message on DCN 22, responding device 16 may broadcast or multicast the pulse response message. In contrast to the example operations of FIGS. 6A-6C, responding device 16 does not determine whether responding device 16 stores a record that corresponds to the optical pulse pattern. In various examples, the pulse response message may contain various elements. For example, the pulse response message may contain elements that identify responding device 16, such as an IP address of responding device 16. Furthermore, in some examples, the pulse response message may contain an element that identifies a port of responding device 16 at which responding device 16 received the optical pulse pattern. In some examples, the pulse response message may contain a line card identifier that identifies a line card of responding device 16 that contains the port at which responding device 16 received the optical pulse pattern.

When responding device 16 sends the pulse response message on DCN 22, initiating device 12 receives the pulse response message (610). In response to receiving the pulse response message, initiating device 12 determines whether any of records 112 in data storage system 102 correspond to the pulse response message (612). In various examples, initiating device 12 may determine that a record corresponds to the pulse response message when the record satisfies a given condition. For example, the given condition may require the record to include a pulse pattern descriptor that describes the optical pulse pattern described in the pulse response message. Furthermore, in this example, the given condition may require the record to include a time identifier that identifies a time that corresponds to a time identified by the pulse response message.

If none of records 112 corresponds to the pulse response message ("NO" of 612), initiating device 12 may ignore the pulse response message (614). On the other hand, if data storage system 102 stores a record that corresponds to the pulse response message ("YES" of 612), initiating device 12 may send a report message on DCN 22 (616). The report message sent by initiating device 12 may indicate that initiating device 12 is physically connected in optical network 13 to responding device 16. In various examples, the report message may contain various elements. For example, the report message may contain the elements shown in the example of FIG. 9.

When initiating device 12 sends the report message on DCN 22, NMS device 20 may receive the report message from DCN 22 (618). In response to receiving the report message, topology unit 172 in NMS device 20 may generate topology data 180 using information in the report message (620). Topology data 180 may indicate that initiating device 12 is physically connected in optical network 13 to responding device 16. In some examples, the report message specifies a port of initiating device 12 and a port of responding device 16. In such examples, topology data 180 may indicate that the specified port of initiating device 12 is connected in optical network 13 to the specified port of responding device 16. In other alternative implementations, initiating device 12 does not send the report message on DCN 22. Rather, in such alternate implementations, initiating device 12 may generate topology data 180. Initiating device 12 may then send topology data 180 on DCN 22. In such alternate implementations, it may not be necessary for NMS device 20 to be present.

As mentioned above, initiating device 12 may select one or more optical pulse patterns in step 600. If initiating device 12 selects a single optical pulse pattern, initiating device 12 may send the same optical pulse pattern on different ports at different times. Initiating device 12 may receive pulse response messages after sending the optical pulse patterns. Initiating device 12 may then perform steps 610-614 with regard to each of the received pulse response messages. Thus, initiating device 12 may send the optical pulse pattern on the first optical fiber of optical network 13 as described above and subsequently send the same optical pulse pattern on a second optical fiber of optical network 13. Initiating device 12 may receive a second pulse response message on DCN 22 after sending the optical pulse pattern on the second optical fiber. The second pulse response message may indicate an optical pulse pattern received by a third device in optical network 13. Initiating device 12 may send a second report message on DCN 22 when the optical pulse pattern received by the third device matches the optical pulse pattern sent by initiating device 12. The second report message may indicate that the third device is physically connected in optical network 13 to initiating device 12.

If initiating device 12 selects multiple optical pulse patterns, initiating device 12 may send the different optical pulse patterns on different ports concurrently. Initiating device 12 may receive pulse response messages after sending the optical pulse patterns. Initiating device 12 may then perform steps 610-614 with regard to each of the received pulse response messages. Thus, initiating device 12 may send a first optical pulse pattern on a first optical fiber of optical network 13 as described above and concurrently send a second optical pulse pattern on a second optical fiber of optical network 13. Initiating device 12 may receive a second pulse response message on DCN 22 after sending the second optical pulse pattern on the second optical fiber. The second pulse response message may indicate an optical pulse pattern received by a third device in optical network 13. Initiating device 12 may send a second report message on DCN 22 when the optical pulse pattern received by the third device matches the second optical pulse pattern. The second report message may indicate that the third device is physically connected in optical network 13 to initiating device 12.

Various embodiments of the invention have been described. These and other embodiments are within the scope of the following claims.

The invention claimed is:

1. A device in an optical network, the device comprising:
   a data communication network (DCN) interface that enables the device to send and receive data on a data communication network separate from the optical network, wherein the DCN interface is configured to receive a message on the data communication network, the message including data that identifies a first device in the optical network and indicates that the first device previously received an optical pulse pattern from an optical fiber in the optical network; and
   a topology unit configured to generate topology data using the message, the topology data indicating that a second device is connected in the optical network to the first device when the received optical pulse pattern matches an optical pulse pattern originated by the second device.

2. The device of claim 1, wherein the DCN interface receives the message from the second device, the message indicating that the second device is physically connected in the optical network to the first device.

3. The device of claim 1, wherein the DCN interface receives the message from the first device, the message indicating that the second device is physically connected in the optical network to the first device.

4. The device of claim 1,
   wherein the DCN interface receives the message from the first device, the message including a pulse pattern descriptor that describes the optical pulse pattern received by the first device; and
   wherein the topology unit is further configured to:
      receive a notification message from the second device, the notification message including data that identify the second device and a pulse pattern descriptor that describes the optical pulse pattern originated by the second device; and
      determine whether the optical pulse pattern received by the first device matches the optical pulse pattern originated by the second device.

5. The device of claim 4,
   wherein the message includes a first time identifier, the first time identifier indicating a time at which the first device received the optical pulse pattern;
   wherein the notification message includes a second time identifier, the second time identifier indicating a time at which the second device will send or has sent the optical pulse pattern;
   wherein the topology unit is configured to determine whether the time indicated by the first time identifier corresponds to the time indicated by the second time identifier; and
   wherein the topology unit generates the topology data when the received optical pulse pattern matches the optical pulse pattern originated by the second device and the time indicated by the first time identifier corresponds to the time identified by the second time identifier.

6. The device of claim 1, wherein the topology data indicates that a port of the second device is physically connected in the optical network to a port of the first device.

7. A non-transitory computer-readable storage medium having instructions stored thereon that, when executed by a processor of a computing device in an optical network, configure the computing device to:
  receive a message on a data communication network separate from the optical network, the message including data that identifies a first device in the optical network and indicates that the first device previously received an optical pulse pattern from an optical fiber in the optical network; and
  generate topology data using the message, the topology data indicating that a second device is connected in the optical network to the first device when the received optical pulse pattern matches an optical pulse pattern originated by the second device.

8. The non-transitory computer-readable storage medium of claim 7, wherein the instructions configure the computing device to receive the message from the second device, the message indicating that the second device is physically connected in the optical network to the first device.

9. The non-transitory computer-readable storage medium of claim 7, wherein the instructions configure the computing device to receive the message from the first device, the message indicating that the second device is physically connected in the optical network to the first device.

10. The non-transitory computer-readable storage medium of claim 9,
  wherein the DCN interface receives the message from the first device, the message including a pulse pattern descriptor that describes the optical pulse pattern received by the first device; and
  wherein the instructions configure the computing device to:
    receive a notification message from the second device, the notification message including data that identify the second device and a pulse pattern descriptor that describes the optical pulse pattern originated by the second device; and
    determine whether the optical pulse pattern received by the first device matches the optical pulse pattern originated by the second device.

11. The non-transitory computer-readable storage medium of claim 10,
  wherein the message includes a first time identifier, the first time identifier indicating a time at which the first device received the optical pulse pattern;
  wherein the notification message includes a second time identifier, the second time identifier indicating a time at which the second device will send or has sent the optical pulse pattern;
  wherein the instructions configure the computing device to determine whether the time indicated by the first time identifier corresponds to the time indicated by the second time identifier; and
  wherein the instructions configure the computing device to generate the topology data when the received optical pulse pattern matches the optical pulse pattern originated by the second device and the time indicated by the first time identifier corresponds to the time identified by the second time identifier.

12. The non-transitory computer-readable storage medium of claim 9, wherein the topology data indicates that a port of the second device is physically connected in the optical network to a port of the first device.

\* \* \* \* \*